(12) United States Patent
Meldal et al.

(10) Patent No.: US 8,796,362 B2
(45) Date of Patent: Aug. 5, 2014

(54) CELLULOSE BASED POLYMER MATERIAL

(75) Inventors: Morten Meldal, København (DK); Renil Manat, Frederiksberg (DK)

(73) Assignee: Carlsberg A/S, Copenhagen (DK)

( * ) Notice: Subject to any disclaimer, the term of this patent is extended or adjusted under 35 U.S.C. 154(b) by 172 days.

(21) Appl. No.: 13/140,186

(22) PCT Filed: Dec. 16, 2009

(86) PCT No.: PCT/DK2009/050339
§ 371 (c)(1),
(2), (4) Date: Aug. 25, 2011

(87) PCT Pub. No.: WO2010/069329
PCT Pub. Date: Jun. 24, 2010

(65) Prior Publication Data
US 2012/0135170 A1   May 31, 2012

(30) Foreign Application Priority Data
Dec. 16, 2008   (DK) .................................. 2008 01816

(51) Int. Cl.
*C08L 1/10* (2006.01)

(52) U.S. Cl.
USPC ........... 524/35; 524/31; 526/238.21; 428/35.7

(58) Field of Classification Search
USPC ................... 524/31, 35; 428/35.7; 526/238.21
See application file for complete search history.

(56) References Cited

U.S. PATENT DOCUMENTS

| | | | | |
|---|---|---|---|---|
| 2,336,985 A | * | 12/1943 | Freund ...................... | 526/238.21 |
| 2,789,030 A | * | 4/1957 | Fetscher ........................... | 8/120 |
| 3,157,527 A | | 11/1964 | Fournet et al. | |
| 3,318,826 A | * | 5/1967 | Bridgeford ................... | 523/207 |
| 4,101,473 A | * | 7/1978 | Lander ............................. | 524/31 |
| 4,656,202 A | * | 4/1987 | Nason et al. ..................... | 522/89 |
| 4,663,388 A | * | 5/1987 | Douglass et al. ............ | 525/54.3 |
| 5,135,965 A | | 8/1992 | Tahan | |
| 5,157,093 A | * | 10/1992 | Harisiades et al. ........... | 527/301 |
| 2004/0075186 A1 | | 4/2004 | Bremser et al. | |
| 2006/0035341 A1 | * | 2/2006 | Boeckh et al. .................. | 435/75 |
| 2007/0014857 A1 | | 1/2007 | Becourt et al. | |
| 2008/0153375 A1 | * | 6/2008 | Wilfong et al. ............... | 442/415 |

FOREIGN PATENT DOCUMENTS

| | | |
|---|---|---|
| DE | 44 31 350 | 3/1996 |
| DE | 195 32 489 | 3/1997 |
| DE | 10 2005 041 330 | 3/2007 |
| EP | 1 967 644 | 9/2008 |

(Continued)

OTHER PUBLICATIONS

Akelah, A., et al., "Synthesis of some vinyl derivatives of cellulose and their grafting copolymerization with styrene," J. App. Polymer Sci., 1981, 26, 3377-3384.*

(Continued)

*Primary Examiner* — Liam J Heincer
*Assistant Examiner* — Nicholas Hill
(74) *Attorney, Agent, or Firm* — Merchant & Gould P.C.

(57) ABSTRACT

The invention relates to a polymer material with several advantageous properties. The polymer material has a low degree of swelling in water, it is biodegradable, it has extremely low permeability to gasses such as $CO_2$ and it has a high strength. The polymer material is useful for a number of purposes, such as for preparing containers for food or beverages. The polymer material is prepared from a prepolymerization mixture comprising grafted plant derived material and monomers and/or cross-linkers.

22 Claims, 10 Drawing Sheets

(56) References Cited

FOREIGN PATENT DOCUMENTS

| | | |
|---|---|---|
| GB | 1128696 | 10/1968 |
| JP | 2005-001911 | 1/2005 |
| JP | 2006-137462 | 6/2006 |
| WO | WO 91/06601 | 5/1991 |
| WO | WO 98/51694 | 11/1998 |
| WO | WO 01/23471 | 4/2001 |
| WO | WO 2008107196 A2 * | 9/2008 |

OTHER PUBLICATIONS

Marsano, E., et al., "Cellulose methacrylate: synthesis and liquid crystalline behavior of solutions and gels," Polymer, 1998, 39, 4289-4294.*

Liu, H., et al., "Surface methacrylation and graft copolymerization of ultrafine cellulose fibers," J. Polymer Sci. Part B, 2003, 41, 953-964.*

Trombino, S., "Synthesis and antioxidant activity evaluation of a novel cellulose hydrogel containing trans-ferulic acid," 2009, Carbohydrate Polymers, 75, 184-188.*

Adanur, S., Wellington Sears Handbook of Industrial Textiles, 1995, p. 563.*

Eastman Cellulose Acetate Priopionate (CAP-504-0.2); Product Data Sheet. Aug. 22, 2006.*

Steinmann, H. W., "Cellulose acetate and triacetate," in Handbook of Fiber Chemistry, Lewin, Menachem, Pearce, and Elii M., 1998, p. 806.*

Edgar et al., "Synthesis and Properties of Cellulose Acetoacetates." *Macromolecules* vol. 28, 1995, pp. 4122-4128.

Rhim et al., "Natural Biopolymer-Based Nanocomposite Films for Packaging Application." *Critical Reviews in Food Science& Nutrition*, vol. 47, No. 4, 2007, pp. 411-433.

Zahran et al., "Peroxydiphosphate-Metal Ion-Cellulose Thiocarbonate Redox System-Induced Graft Copolymerization of Vinyl Monomers Onto Cotton Fabric." *J. Appl. Polymer Science*, vol. 87, 2003, pp. 1879-1889.

International Search Report for Application No. PCT/DK2009/050339 mailed Apr. 27, 2010.

International Search Report for Application No. PCT/DK2009/050340 mailed Jun. 10, 2010.

* cited by examiner

A)

B)

| Size (μm) | Volume in% | Size (μm) | Volume in% | Size (μm) | Volume in% | Size (μm) | Volume in% | Size (μm) | Volume in% | Size (μm) | Volume in% |
|---|---|---|---|---|---|---|---|---|---|---|---|
| 0.010 | | 0.105 | | 1.096 | | 11.482 | | 120.226 | | 1258.925 | |
| 0.011 | 0.00 | 0.120 | 0.00 | 1.259 | 0.00 | 13.183 | 0.57 | 138.038 | 3.58 | 1445.440 | 0.44 |
| 0.013 | 0.00 | 0.138 | 0.00 | 1.445 | 0.00 | 15.136 | 0.62 | 158.489 | 4.08 | 1699.587 | 0.21 |
| 0.015 | 0.00 | 0.158 | 0.00 | 1.660 | 0.00 | 17.378 | 0.67 | 181.970 | 4.60 | 1905.451 | 0.07 |
| 0.017 | 0.00 | 0.182 | 0.00 | 1.905 | 0.00 | 19.953 | 0.72 | 208.930 | 5.11 | 2187.762 | 0.02 |
| 0.020 | 0.00 | 0.209 | 0.00 | 2.188 | 0.00 | 22.909 | 0.77 | 239.883 | 5.54 | 2511.886 | 0.00 |
| 0.023 | 0.00 | 0.240 | 0.00 | 2.512 | 0.02 | 26.303 | 0.82 | 275.423 | 5.87 | 2884.032 | 0.00 |
| 0.026 | 0.00 | 0.275 | 0.00 | 2.884 | 0.04 | 30.200 | 0.88 | 316.228 | 6.04 | 3311.311 | 0.00 |
| 0.030 | 0.00 | 0.316 | 0.00 | 3.311 | 0.14 | 34.674 | 0.95 | 363.078 | 6.02 | 3801.894 | 0.00 |
| 0.035 | 0.00 | 0.363 | 0.00 | 3.902 | 0.29 | 39.811 | 1.05 | 416.869 | 5.81 | 4365.158 | 0.00 |
| 0.040 | 0.00 | 0.417 | 0.00 | 4.365 | 0.38 | 45.709 | 1.20 | 478.630 | 5.42 | 5011.872 | 0.00 |
| 0.046 | 0.00 | 0.479 | 0.00 | 5.012 | 0.45 | 52.481 | 1.37 | 549.541 | 4.88 | 5754.399 | 0.00 |
| 0.052 | 0.00 | 0.550 | 0.00 | 5.754 | 0.49 | 60.256 | 1.58 | 630.957 | 4.22 | 6606.934 | 0.00 |
| 0.060 | 0.00 | 0.631 | 0.00 | 6.607 | 0.50 | 69.183 | 1.81 | 724.436 | 3.50 | 7585.776 | 0.00 |
| 0.069 | 0.00 | 0.724 | 0.00 | 7.586 | 0.51 | 79.433 | 2.08 | 831.764 | 2.75 | 8709.636 | 0.00 |
| 0.079 | 0.00 | 0.832 | 0.00 | 8.710 | 0.51 | 91.201 | 2.39 | 964.993 | 2.01 | 10000.000 | 0.00 |
| 0.091 | 0.00 | 0.955 | 0.00 | 10.000 | 0.52 | 104.713 | 2.73 | 1096.478 | 1.31 | | |
| 0.105 | 0.00 | 1.095 | 0.00 | 11.482 | 0.54 | 120.226 | 3.13 | 1258.925 | 0.78 | | |

A)

B)

C)

D)

CELLULOSE BASED POLYMER MATERIAL

This application is a National Stage Application of PCT/DK2009/050339, filed 16 Dec. 2009, which claims benefit of Serial No. PA 2008 01816, filed 16 Dec. 2008 in Denmark and which applications are incorporated herein by reference. To the extent appropriate, a claim of priority is made to each of the above disclosed applications.

All patent and non-patent references cited in the application are hereby incorporated by reference in their entirety.

FIELD OF INVENTION

The present invention relates to the field of polymer materials, in particular to biodegradable polymers prepared at least in part from natural fibres. The polymer materials of the invention are useful for several purposes including containers for liquids and even for carbonated liquids.

BACKGROUND OF INVENTION

Packaged liquids are sold in a large number world wide; however, the packaging material often is difficult to dispose. In particular, carbonated drinks are generally filled in glass containers or plastic container, both of which pose problems with disposal.

Cellulose-based packaging materials have been used for storing liquids, in particular non-carbonated liquids. Thus, the use of TetraPak is a practical approach for using cellulose-based cartons for storing liquids.

In addition, nanocomposite films of natural biopolymers are being employed in food packaging applications, but not as containers for liquids (Rhim et al., 2007, Critical Review in Food Science and Nutrition, 47:411-433). A graft copolymer of cellulose fibre (cotton, hemp, or rayon) and poly-methacrylic acid has been used in carton boxes for food storage. This material was found to be having deodorizing-antimicrobial effects, however, is not useful for storage of liquids (JP2006137462).

Cellulose resin containing isocyanate ethylmethacrylate are used as binder for ceramic raw material powder. The binder provides ceramic green sheet with good adhesivity, mechanical property and strength, however, is not useful for preparation of containers for liquids as such (JP2005001911). Cotton cellulose radiation grafting of metharylic acid has also been reported. Vinyl monomers are grafted on cotton fabric using redox catalyst. Vinyl monomer grafted cellulose fabric is crosslinked with hexamethylenediamine to improve the dyeability of the final fabric. These fabrics can be used for preparation of clothes and other textile products (Zahran et al., 2003, Journal of Applied Polymer Science, 87: 1878-1889).

In another study involving poly(propylene carbonate) (PPC); starch-g-poly(methylacrylate) (S-g-PMA) copolymer was used to reinforce PPC. TG (thermogravimetry) results indicate that the S-g-PMA addition lead to an improvement in thermal stability of resulting composites (Ge, X. C., Xu, Y., Meng, Y. Z., & Li, R. K. Y. (2005). Thermal and mechanical properties of biodegradable composites of poly(propylene carbonate) and starch-poly(methyl acrylate) graft copolymer. Composites Science and Technology, 65, 2219-2225.).

SUMMARY OF INVENTION

Accordingly, there is a need for new and improved cellulose based polymer materials, in particular durable material, which for example can be used as containers for liquid.

Interestingly, the present invention provides cellulose based polymers, which are durable and may be useful as containers for liquids, even as containers for carbonated beverages.

It is one objective of the present invention to provide polymer materials which are copolymers polymerised at least from:
  a. At least one plant fibre material, which is covalently —O-linked to

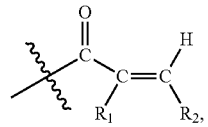

wherein $R_1$ and $R_2$ independently are selected from the group consisting of —H, lower alkyl, lower alcohols, lower alkoxy, lower ethers, lower alkenyl, halogen and lower alkyl substituted with halogen, and
  b. At least one filler material with an average particle size of at the most 750 μm, said filler material consisting of a filler covalently —O-linked to

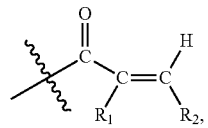

wherein $R_1$ and $R_2$ independently are selected from the group consisting of —H, lower alkyl, lower alcohols, lower alkoxy, lower ethers, lower alkenyl, halogen and lower alkyl substituted with halogen, wherein said filler comprises a polymer covalently linked to —OH or a long chain alcohol; and
  c. At least one monomer of the general structure

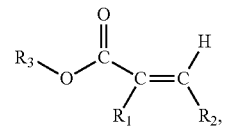

or the general structure

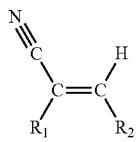

wherein $R_1$ and $R_2$ independently are selected from the group consisting of —H, lower alkyl, lower alcohols, lower alkoxy, lower ethers, lower alkenyl, halogen and lower alkyl substituted with halogen and $R_3$ is selected from the group consisting of linear and branched alkyl, alkenyl, alkoxy, ethers, aliphatic ring optionally comprising heteroatoms, alcohols, halogen, alkyl substituted with halogen and —H.

In addition to the abovementioned monomers, additional components may be added, for example crosslinkers.

It is also an objective of the present invention to provide a polymer material which is a copolymer polymerised at least from:

a. at least one filler material with an average particle size of at the most 750 μm, preferably of at the most 250 μm, said filler material consisting of a filler covalently —O— linked to

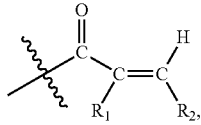

wherein $R_1$ and $R_2$ independently are selected from the group consisting of —H, lower alkyl, lower alcohols, lower alkoxy, lower ethers, lower alkenyl, halogen and lower alkyl substituted with halogen, wherein said filler comprises a polymer covalently linked to —OH or a long chain alcohol; and b. At least one monomer and/or at least one cross-linker, wherein
   i. the monomer is a monomer of the general structure

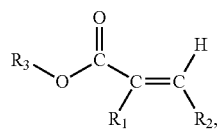

or the general structure

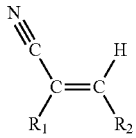

wherein $R_1$ and $R_2$ independently are selected from the group consisting of —H, lower alkyl, lower alcohols, lower alkoxy, lower ethers, lower alkenyl, halogen and lower alkyl substituted with halogen and $R_3$ is selected from the group consisting of linear and branched alkyl, alkenyl, alkoxy, ethers, aliphatic ring optionally comprising heteroatoms, alcohols, halogen, alkyl substituted with halogen and —H and wherein ii. the cross-linker is a sugar moiety covalently O-linked to at least two

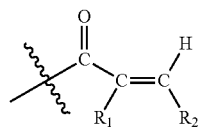

groups,
   wherein $R_1$ and $R_2$ independently are selected from the group consisting of —H, lower alkyl, lower alcohols, lower alkoxy, lower ethers, lower alkenyl, halogen and lower alkyl substituted with halogen, and wherein said two groups may be identical or different; and c. Optionally, at least one plant fibre material, which is covalently —O-linked to

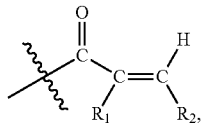

wherein $R_1$ and $R_2$ independently are selected from the group consisting of —H, lower alkyl, lower alcohols, lower alkoxy, lower ethers, lower alkenyl, halogen and lower alkyl substituted with halogen.

The invention also relates to methods for preparing said polymer materials and methods for preparing useful plant fibre materials and filler materials.

Furthermore, the invention relates to products prepared from said polymer material, such as containers (such as bottles) or food storage materials.

DETAILED DESCRIPTION OF THE INVENTION

Polymer

Figure 1:
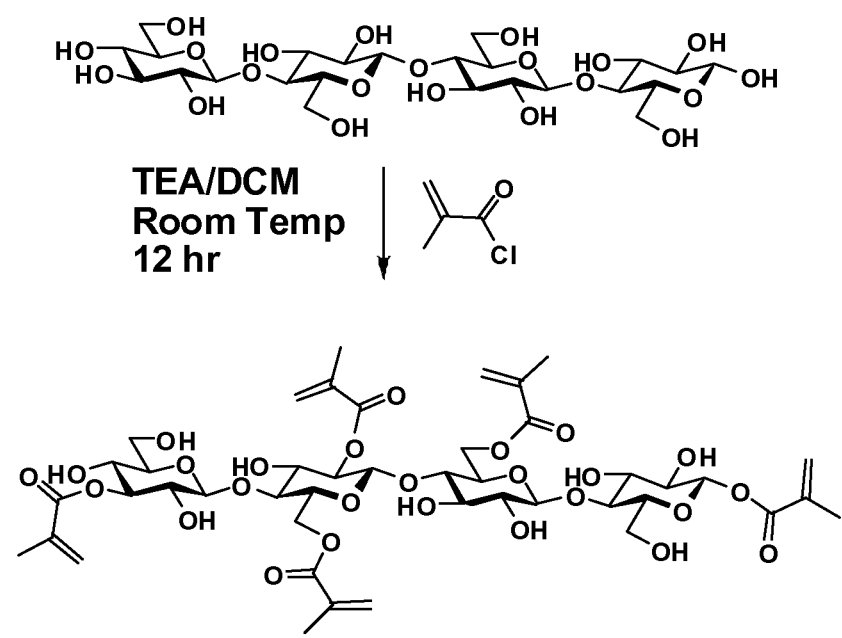
FIG. 1 shows a schematic representation of a methacryloylation reaction. In this example a reaction between cellulose and methacrylate chloride is shown, however the skilled person a similar reaction may take place using a filler or plant fibre comprising cellulose. A similar reaction can be performed with other compounds similar to methacrylate chloride such as the compounds described herein below.

The present invention relates to a polymer material, which is a co-polymer of several constituents, said constituents herein designated "polymer constituents". In general the polymer material is described in terms of the constituents from which it is polymerised. The co-polymer is prepared by mixing the constituents and optionally other components in a pre-polymerisation mixture and initiating polymerisation.

The polymer material of the invention is obtained by co-polymerisation of at least 2 different constituents, wherein said at least 2 different constituents are
 a. at least one filler material with an average particle size of at the most 750 μm, such as at the most 250 μm, which may be any of the filler materials described herein below in the section filler material; and
 b. at least one monomer and/or at least one cross-linker, wherein the monomer may be any of the monomers described herein below in the section "Monomers" and the cross-linker may be any of the cross-linkers described herein in the section "Cross-linker".

The polymer material of the invention is in one preferred embodiment obtained by co-polymerisation of at least said 3 different constituents, wherein said at least 3 different constituents are
 a) A filler material with an average particle size of at the most 750 μm, such as at the most 250 μm, said filler material consisting of filler covalently —O-linked to

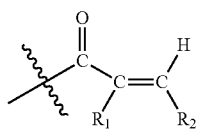

wherein $R_1$ is selected from the group consisting of —H, lower alkyl, lower alcohols, lower alkoxy, lower ethers, lower alkenyl, halogen and lower alkyl substituted with halogen and $R_2$ is selected from the group consisting of —H, lower alkyl, lower alcohols, lower alkoxy, lower ethers, lower alkenyl, halogen and lower alkyl substituted with halogen, wherein said filler comprises a polymer covalently linked to —OH or a long chain alcohol (preferably the filler comprises cellulose) and said filler material may be any of the filler materials described herein in the sections "Filler" and "Plant fibre material and filler material"; and
 b) A monomer of the general structure

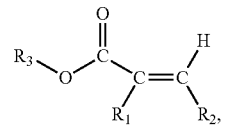

or the general structure

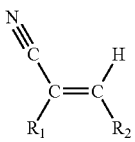

wherein $R_1$ is selected from the group consisting of —H, lower alkyl, lower alcohols, lower alkoxy, lower ethers, lower alkenyl, halogen and lower alkyl substituted with halogen and $R_2$ is selected from the group consisting of —H, lower alkyl, lower alcohols, lower alkoxy, lower ethers, lower alkenyl, halogen and lower alkyl substituted with halogen, and $R_3$ is selected from the group consisting of linear and branched alkyl, alkenyl, alkoxy, ethers, aliphatic ring optionally comprising heteroatoms, alcohols, halogen, alkyl substituted with halogen and —H, and which may be any of the monomers described herein below in the section "Monomer"; and
 c) A plant fibre material, which is covalently —O-linked to

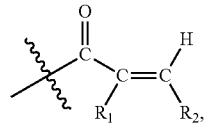

wherein $R_1$ is selected from the group consisting of —H, lower alkyl, lower alcohols, lower alkoxy, lower ethers, lower alkenyl, halogen and lower alkyl substituted with halogen and $R_2$ is selected from the group consisting of —H, lower alkyl, lower alcohols, lower alkoxy, lower ethers, lower alkenyl, halogen and lower alkyl substituted with halogen, and which may be any of the plant fibre materials described herein below in the sections "Plant fibre" and "Plant fibre material and filler material".

In embodiments of the invention wherein the polymer material is prepared from a pre-polymerisation mixture, which does not comprise a plant fibre material, then it is very preferred that the filler material is derived from a plant, i.e. that the filler is derived from a plant, and more preferably that the filler consists of material from one or more plants.

The polymer material may be prepared from a pre-polymerisation mixture comprising one or more plant fibre materials according to c) above, such as one kind of plant fibre material, such as two different kinds of plant fibre material, for example 3 different kinds plant fibre material, for example 4 different kinds of plant fibre material, such as 5 different kinds of plant fibre material, for example more than 5 different kinds of plant fibre material, such as in the range of 5 to 10 different kinds of plant fibre material, for example in the range of 10 to 20 different kinds of plant fibre material, such as more than 20 different kinds of plant fibre material according to c) above. It is however preferred that the polymer material is polymerised from a pre-polymerisation mixture comprising only in the range of 1 to 5 different plant fibre materials, more preferably only in the range of 1 to 2 different plant fibre materials, more preferably only one kind of plant fibre material according to c) above.

The polymer material may prepared from a pre-polymerisation mixture comprising one or more filler materials according to a) above, such as one kind of filler material, such as two different kinds of filler material, for example 3 different kinds filler material, for example 4 different kinds of filler material, such as 5 different kinds of filler material, for example more than 5 different kinds of filler material, such as in the range of 5 to 10 different kinds of filler material, for example in the range of 10 to 20 different kinds of filler material, such as more than 20 different kinds of filler material according to a) above. It is however preferred that the polymer material is polymerised from a pre-polymerisation mixture comprising only in the range of 1 to 5 different filler materials, more preferably only in the range of 1 to 3 different filler materials, more preferably only 1 to 2 different kinds of filler material according to a) above.

The polymer material may prepared from a pre-polymerisation mixture comprising one or more monomers according to b) above, such as one kind of monomer, such as two different kinds of monomers, for example 3 different kinds monomers, for example 4 different kinds of monomers, such as 5 different kinds of monomers, for example more than 5 different kinds of monomers, such as in the range of 5 to 10 different kinds of monomers, for example in the range of 10 to 20 different kinds of monomers, such as more than 20 different kinds of monomers according to b) above. It is however preferred that the polymer material is polymerised from a pre-polymerisation mixture comprising in the range of 1 to 10 different monomers, more preferably in the range of 2 to 5 different monomers, more preferably in the range of 2 to 3 different kinds of monomers according to b) above.

The polymer material may be prepared from a pre-polymerisation mixture comprising one or more cross-linkers, wherein the cross-linker is a sugar moiety covalently O-linked to at least two

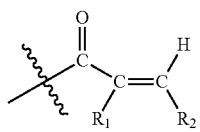

groups, wherein $R_1$ and $R_2$ independently are selected from the group consisting of —H, lower alkyl, lower alcohols, lower alkoxy, lower ethers, lower alkenyl, halogen and lower alkyl substituted with halogen, and wherein said two groups may be identical or different. The polymer material may be prepared from a pre-polymerisation mixture comprising one or more of said cross-linkers, such as one kind of said cross-linkers, such as two different kinds of said cross-linkers, for example 3 different kinds said cross-linkers, for example 4 different kinds of said cross-linkers, such as 5 different kinds of said cross-linkers, for example more than 5 different kinds of said cross-linkers. It is however preferred that the polymer material is polymerised from a pre-polymerisation mixture comprising in the range of 1 to 10 different cross-linkers, more preferably in the range of 1 to 5 different cross-linkers, more preferably in the range of 1 to 2 different kinds of said cross-linkers.

In addition to said constituents the pre-polymerisation mixture may also contain additional compounds, which may or may not be polymer constituents, however preferably are polymer constituents.

In a preferred embodiment of the invention the polymer material is polymerised at from the above-mentioned constituents and at least one cross-linker, wherein the cross-linker, may be any of the cross-linkers described herein below in the section "Cross-linker".

After mixing the constituents of the polymer, the polymerisation may be undertaken as described herein below in the section "Polymerisation".

Plant Fibre

The polymer material according to the present invention is polymerised from a pre-polymerisation mixture preferably comprising at least one plant fibre material, which is covalently —O-linked to

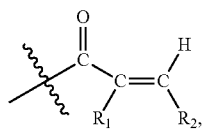

wherein $R_1$ is selected from the group consisting of —H, lower alkyl, lower alcohols, lower alkoxy, lower ethers, lower alkenyl, halogen and lower alkyl substituted with halogen and $R_2$ is selected from the group consisting of —H, lower alkyl, lower alcohols, lower alkoxy, lower ethers, lower alkenyl, halogen and lower alkyl substituted with halogen.

The plant fibre material is prepared by obtaining a plant fibre and covalently linking said plant fibre to

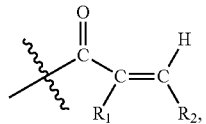

Wherein $R_1$, $R_2$ and $R_3$ are as described above, by any of the method described herein below.

The plant fibre is obtained from a plant. Any plant producing strong plant fibres may be used as source of the plant fibre. Depending on the nature of the plant various parts of the plant may be used as source of the plant fibre, for example the source of the plant fibre may be stem, leaves, roots or fruits.

Preferably, the plant fibre is obtained from a plant selected from the group consisting of Abaca, Bagasse, Bamboo, Banana, Broom root, Cantala, Caroa, China jute, Coir, Cotton, Curaua, Date palm, Flax, Hemp, Henequen, Isora, Istle, Jute, Kapok, Kenaf, Kudzu, Mauritius hemp, Nettle, Oil palm, Piassava, Pineapple, Phormium, Roselle, Ramie, Sansevieria, Sisal, Sponge gourd, Cereals, Sun hemp, Cadillo/urena and Wood.

Thus, the plant fibre material may comprise fibres from one or more plants selected from the group consisting of Abaca, Bagasse, Bamboo, barley, Banana, Broom root, Cantala, Caroa, China jute, Coir, Cotton, Curaua, Date palm, Flax, Hemp, Henequen, Isora, Istle, Jute, Kapok, Kenaf, Kudzu, Mauritius hemp, Nettle, Oil palm, Piassava, Pineapple, Phormium, Roselle, Ramie, Sansevieria, Sisal, Sponge gourd, Cereals, Sun hemp, Cadillo/urena and Wood.

Cereals may for example be selected from the group consisting of barley, wheat, rye, oat, maize, rice, sorghum, millet, triticale, buckwheat, fonio and quinona. More preferably, the cereal is selected from the groups consisting of barley, wheat, rye, oat, maize and rice, more preferably the cereal is barley. The plant fibre may for example be obtained from straw of said cereal.

In a preferred embodiment the plant fibre material may comprise fibres from one or more plants selected from the group consisting of Banana, Coir, Hemp, Pineapple, manilla and Sisal, more preferably Sisal.

Very preferably, if plant fibres are derived from any of the aforementioned plants, they are preferably derived from the part of the plants as indicated in Table 1 below.

TABLE 1

List of important biofibres

| Fibre source | Species | Origin |
|---|---|---|
| Abaca | *Musa textilis* | Leaf |
| Bagasse - | Grass | |
| Bamboo (>1250 species) | Grass | |
| Banana | *Musa indica* | Leaf |
| Broom root | *Muhlenbergia macroura* | Root |
| Cantala | *Agave cantala* | Leaf |
| Caroa | *Neoglaziovia variegate* | Leaf |
| China jute | *Abutilon theophrasti* | Stem |
| Coir | *Cocos nucifera* | Fruit |
| Cotton | *Gossypium* sp. | Seed |
| Curaua | *Ananas erectifolius* | Leaf |
| Date palm | *Phoenix Dactylifera* | Leaf |
| Flax | *Linum usitatissimum* | Stem |
| Hemp | *Cannabis sativa* | Stem |
| Henequen | *Agave fourcroydes* | Leaf |
| *Isora* | *Helicteres isora* | Stem |
| Istle | *Samuela carnerosana* | Leaf |
| Jute | *Corchorus capsularis* | Stem |
| Kapok | *Ceiba pentranda* | Fruit |
| Kenaf | *Hibiscus cannabinus* | Stem |
| Kudzu | *Pueraria thunbergiana* | Stem |
| Mauritius hemp | *Furcraea gigantea* | Leaf |
| Nettle | *Urtica dioica* | Stem |
| Oil palm | *Elaeis guineensis* | Fruit |
| Piassava | *Attalea funifera* | Leaf |
| Pineapple | *Ananus comosus* | Leaf |
| *Phormium* | *Phormium tenas* | Leaf |
| Roselle | *Hibiscus sabdariffa* | Stem |
| Ramie | *Boehmeria nivea* | Stem |
| *Sansevieria* | (Bowstring hemp) *Sansevieria* | Leaf |
| Sisal | *Agave sisilana* | Leaf |
| Sponge gourd | *Luffa cylinderica* | Fruit |
| Straw (Cereal) - Stalk | | |
| Sun hemp | *Crorolaria juncea* | Stem |
| Cadillo/*urena* | *Urena lobata* | Stem |
| Wood | (>10,000 species) | Stem |

Plant fibres are commercially available from many sources. For example many plant fibre can be obtained from Randers REB international NS, Denmark (for example Sisal (white), Code no: N26-0040-001N, Hemp (gray), Code no: N04-0060-000N and Manil.H (dark brown) Code no: N18-0060-001N). Also plant fibre already processed into rope may be used as plant fibre. Such ropes are also available from Rander REB international NS. The ropes must be divided in smaller parts as described below before use.

Coir fibres are fibres of coconut. The individual fibers are in general narrow and long, with thick walls made of cellulose. In general the coir fibres to be used with the present invention are light brown and they may be approximately 20 to 25 cm long. Before use they are divided in smaller parts as described below. Typically, to obtain useful coir fibres, the coir fibres are soaked in water to swell and soften the fibres. The fibres may then be separated according to size. Coir fibres already treated in this way are commercially available, for example companies based in Kerala, India.

Banana fibres are also commercially obtainable. The preferred banana fibres used with the present polymers are off white and typically 65 to 70 cm long. Before use they are divided in smaller parts as described below.

Preferably, the plant fibres are provided in smaller pieces, in particular it is preferred that the plant fibre has an average particle size of in the range of 1 to 25 mm, preferably in the range of 1 to 20 mm. more preferably in the range of 1 to 15 mm, yet more preferably in the range of 1 to 10 mm, such as in the range of 1 to 5 mm. In a preferred embodiment the plant fibres may be even smaller, such as having an average particle size of in the range of 100 μm to 1 mm, preferably in the range of 100 μm to 500 μm, more preferably in the range of 100μ to 300 μm. Thus, the average particle size of the plant fibre to be used with the present invention may be in the range of 100 μm to 25 mm. Preferably, the shape of the plant fibre is elongated and thus preferably the average particle size denotes the length of the plant fibre. It is particularly preferred that the plant fibres to be used with the present invention are elongated in shape and accordingly, it is preferred that the plant fibre is at least 10 times, preferably at least 20 times, more preferably at least 30 times, such as in the range of 30 to 20,000 times, for example in the range of 30 to 10,000 times, such as in the range of 30 to 5,000 times, for example in the range of 30 to 1000 times, such as in the range of 30 to 500 times, for example in the range of 30 to 100 times longer than it is wide.

The plant fibre may be prepared from longer plant fibres which are turned into fibre of the desired size by any useful means, for example by use of cutting means. Cutting means may for example be a knife, a blender, scissors or any other useful cutting means.

In general plant fibres comprise polymers and it is preferred that the plant fibre used with the present invention at least comprises cellulose, more preferably the plant fibres comprises cellulose and hemicellulose.

Filler

The polymer material according to the present invention is polymerised from a mixture comprising at least one filler material comprising a polymer covalently linked to —OH or a long chain alcohol covalently —O-linked via said —OH to

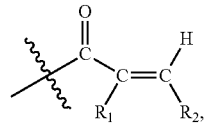

wherein $R_1$ is selected from the group consisting of —H, lower alkyl, lower alcohols, lower alkoxy, lower ethers, lower alkenyl, halogen and lower alkyl substituted with halogen and $R_2$ is selected from the group consisting of —H, lower alkyl, lower alcohols, lower alkoxy, lower ethers, lower alkenyl, halogen and lower alkyl substituted with halogen.

The filler material is prepared by obtaining a filler and covalently linking said filler to

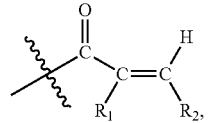

wherein $R_1$ and $R_2$ are as described above, by any of the method described herein below.

The filler comprises a polymer comprising —OH groups or a long chain alcohol.

Within the meaning of the present invention a long chain alcohol is a linear or branched alkyl or alkenyl covalently linked to one or more —OH groups, or a mono or diglyceride consisting of glycerol covalently bonded to one or two alkyl-C(O)O— or alkenyl-C(O)O via ester bonds, said alkyl or alkenyl comprising at least 10 carbon atoms. Thus, the alkyl is preferably a $C_{10-30}$ alkyl, more preferably a $C_{10-20}$, even more preferably a $C_{8-18}$ linear or branched alkyl, more preferably linear alkyl. The alkenyl is preferably a $C_{10-30}$ alkenyl, more preferably a $C_{10-20}$, even more preferably a $C_{8-18}$ linear or branched alkenyl, more preferably linear alkenyl. The alkenyl may comprise one or more double bonds, such as in the range of 1 to 4 double bonds, for example in the range of 1 to 2 double bonds, such as 1 double bond. The long chain alcohol may comprise one or more —OH groups, for example in the range of 1 to 4 —OH groups, preferably, the long chain alcohol comprises only one —OH group, said —OH being —O-linked to

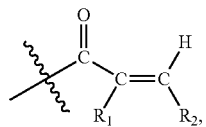

when the long chain alcohol is converted to a filler material. Thus in one embodiment the fillers according to the present invention are $C_{10-14}$-alkyl-OH, preferably $CH_3(CH_2)_{11}$—OH or $CH_3(CH_2)_{13}$—OH, even more preferably $CH_3(CH_2)_{11}$—OH. Thus a preferred filler material is lauryl acrylate. In another embodiment the fillers are mono- or diglycerides.

The filler may preferably comprise or even consist of a polymer comprising —OH. A polymer comprising —OH may be any polymer covalently linked to one or more —OH groups. Preferably, the polymer may comprise one or more —OH groups in every monomer from which the polymer is polymerised. Even more preferably, every monomer comprises one or more —OH groups even after polymerisation. A preferred example of such a polymer is a polymer of sugar moieties, such as glucose monomers. A very preferred polymer is cellulose. Thus, preferably, the filler comprises or even consists of cellulose. Fillers comprising cellulose may for example be derived from plants, such as finely divided plant fibre or it may be cellulose composites. However, the filler may also be purified cellulose, such as crystalline cellulose. In a preferred embodiment of the invention, the filler is a finely divided plant fibre. In embodiments of the invention, wherein the polymer material is polymerised from a mixture, which does not comprise plant fibre material, then it is preferred that the filler is finely divided plant fibre from one or more different plants.

Cellulose is a polysaccharide consisting essentially of polymerized glucose monomer units, in general cellulose is a linear chain of D-glucose monomer units linked by β-(1→4) bonds. The cellulose polysaccharide preferably consists of in the range of 300 to 15,000, for example in the range of 500 to 10,000 glucose monomer units.

When the filler comprises cellulose, the filler material in general comprises cellulose covalently —O— to

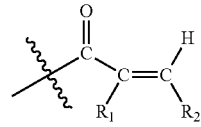

via ester bonds to one or more of the free —OH groups of the glucose monomer units.

Another preferred polymer wherein each monomer unit is covalently linked to an —OH group is polyvinyl alcohol. Polyvinyl alcohol is a polymer of —$(CH_2)CH(OH)$—. Thus, the filler may comprise or even consist of polyvinyl alcohol. When the filler comprises polyvinyl alcohol, the filler material in general comprises polyvinyl alcohol covalently —O— to

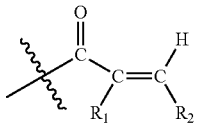

via ester bonds to one or more of the free —OH groups of the —$(CH_2)CH(OH)$— units.

The filler may also comprise or consist of polymers, which are polyethers. Preferably, said polyether is a polymer of the formula OH-((lower alkyl)-O—)$_n$—H. Said lower alkyl is preferably $C_{1-6}$, more preferably $C_{1-3}$, even more preferably $C_{2-3}$ linear or branched alkyl. n is an integer, which preferably is at least 9, more preferably at least 10, for example at least 15, such as at least 20. In a very preferred embodiment the polyether is polyethylene glycol (PEG) or polypropylene glycol (PPG). In general polyethers only comprise free —OH groups at the ends. Thus, when the filler comprises polyethers, the filler material in general comprises polyethers covalently —O— to

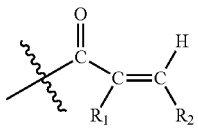

via ester bonds to one or both of the free —OH groups at the ends of the polyether.

However, very preferred fillers according to the invention comprise cellulose. In particularly preferred embodiments, the filler is a finely divided plant fibre comprising cellulose.

It is of importance that the filler is provided in the form of small particles, preferably in the form of a powder. In particular, it is preferred that the filler comprises or even consists of finely grinded plant material. Thus, it is preferred that the filler has an average particle size of at the most 750 μm, preferably at the most 600 μm, even more preferably at the most 500 μm, yet more preferably at the most 400 μm, even more preferably at the most 300 μm, yet more preferably at the most 250 μm, such as in the range of 1 to 750 μm, for example in the range of 1 to 700 μm, such as in the range of 1 to 600 μm, for example in the range of 1 to 500 μm, such as in the range of 1 to 400 μm, for example in the range of 1 to 300 μm, such as in the range of 0.1 to 750 μm, for example in the range of 0.1 to 700 μm, such as in the range of 0.1 to 600 μm, for example in the range of 0.1 to 500 μm, such as in the range of 0.1 to 400 μm, for example in the range of 0.1 to 300 μm, such as in the range of 100 to 750 μm, for example in the range of 100 to 600 μm, such as in the range of 100 to 500 μm, for example in the range of 100 to 400 μm, such as in the range of 100 to 250 μm. Within the present context it should be noted that the term "particle size" is not equivalent to "particle width", but preferably the term "particle size" refers to the largest size of a given particle. It is thus very preferred that the average longest cross section of the particles is at the most of 750 μm, preferably at the most 600 μm, even more preferably at the most 500 μm, yet more preferably at the most 400 μm, even more preferably at the most 300 μM, yet more preferably at the most 250 μm, such as in the range of 0.1 to 750 μm, for example in the range of 0.1 to 700 μm, such as in the range of 0.1 to 600 μm, for example in the range of 0.1 to 500 μm, such as in the range of 0.1 to 400 μm, for example in the range of 0.1 to 300 μm, for example in the range of 0.1 to 250 μm, such as in the range of 100 to 750 μm, for example in the range of 100 to 600 μm, such as in the range of 100 to 500 μm, for example in the range of 100 to 400 μm, such as in the range of 100 to 250 μm. It is further preferred that the mode of the particle sizes of the filler is at the most 750 μm, preferably at the most 600 μm, even more preferably at the most 500 μm, yet more preferably at the most 400 μm, such as at the most 300 μm, for example at the most 250 μm, such as in the range of 0.1 to 750 μm, for example in the range of 0.1 to 700 μm, such as in the range of 0.1 to 600 μm, for example in the range of 0.1 to 500 μm, such as in the range of 0.1 to 400 μm, for example in the range of 0.1 to 300 μm, for example in the range of 0.1 to 250 μm, such as in the range of 100 to 750 μm, for example in the range of 100 to 600 μm, such as in the range of 100 to 500 μm, for example in the range of 100 to 400 μm. It is also preferred that the mode of the longest particle cross section of the filler is at the most 750 μm, preferably at the most 600 μm, even more preferably at the most 500 μm, yet more preferably at the most 400 μm, such as at the most 300 μm, for example at the most 250 μm, such as in the range of 0.1 to 750 μm, for example in the range of 0.1 to 700 μm, such as in the range of 0.1 to 600 μm, for example in the range of 0.1 to 500 μm, such as in the range of 0.1 to 400 μm, for example in the range of 0.1 to 300 μm, for example in the range of 0.1 to 250 μm, such as in the range of 100 to 750 μm, for example in the range of 100 to 600 μm, such as in the range of 100 to 500 μm, for example in the range of 100 to 400 μm.

Thus, it is preferred that the filler comprises or preferably consists of plant material, which has been grinded to an average particle size of at the most 750 μm, preferably at the most 600 μm, even more preferably at the most 500 μm, yet more preferably at the most 400 μm, preferably at the most 300 μm, even more preferably at the most 250 μm, such as in the range of 0.1 to 750 μm, for example in the range of 0.1 to 700 μm, such as in the range of 0.1 to 600 μm, for example in the range of 0.1 to 500 μm, such as in the range of 0.1 to 400 μm, for example in the range of 0.1 to 300 μm, for example in the range of 0.1 to 250 μm, such as in the range of 100 to 750 μm, for example in the range of 100 to 600 μm, such as in the range of 100 to 500 μm, for example in the range of 100 to 400 μm, such as in the range of 100 to 250 μm. It thus very preferred that the average longest cross section of said grinded plant material particles is at the most of 750 μm, preferably at the most 600 μm, even more preferably at the most 500 μm, yet more preferably at the most 400 μm, even more preferably at the most 300 μm, even more preferably at the most 250 μm, such as in the range of 0.1 to 750 μm, for example in the range of 0.1 to 700 μm, such as in the range of 0.1 to 600 μm, for example in the range of 0.1 to 500 μm, such as in the range of 0.1 to 400 μm, for example in the range of 0.1 to 300 μm, such as in the range of 100 to 750 μm, for example in the range of 100 to 600 μm, such as in the range of 100 to 500 μm, for example in the range of 100 to 400 μm, such as in the range of 100 to 250 μm.

In one embodiment of the invention it is furthermore preferred that at least a fraction of the filler particles are extremely small. Accordingly it is preferred that at least 1%, more preferably at least 2%, even more preferably at least 3% of the particles of the filler has a particle size of at the most 10 μm. It is even more preferred that at least 1%, preferably at least 2%, even more preferably at least 3% of the particles of the filler has a longest cross section which is at the most 10 μm. Thus, the filler may in one embodiment of the invention be finely grinded plant material wherein at least 1%, more preferably at least 2%, even more preferably at least 3% of the particles of said grinded plant material has a particle size of at the most 10 μm.

It is furthermore preferred that at least a fraction of the filler particles are very small. Accordingly it is preferred that at least 1%, more preferably at least 5%, even more preferably at least 10% of the particles of the filler has a particle size of at the most 35 μm. It is even more preferred that at least 1%, preferably at least 5%, even more preferably at least 10% of the particles of the filler has a longest cross section which is at the most 35 μm. Thus, the filler may in one embodiment of the invention be finely grinded plant material wherein at least 1%, more preferably at least 5%, even more preferably at least 10% of the particles of said grinded plant material has a particle size of at the most 35 μm.

It is furthermore preferred that a significant fraction of the filler particles are relatively small. Accordingly it is preferred that at least 10%, more preferably at least 20%, even more preferably at least 30%, yet more preferably at least 40%, yet more preferably at least 50% of the particles of the filler has a particle size of at the most 240 μm. It is even more preferred that at least 10%, more preferably at least 20%, even more preferably at least 30%, yet more preferably at least 40%, yet more preferably at least 50% of the particles of the filler has a longest cross section which is at the most 240 μm. Thus, the filler may in one embodiment of the invention be finely grinded plant material wherein at least 10%, more preferably at least 20%, even more preferably at least 30%, yet more preferably at least 40%, yet more preferably at least 50% of the particles of said grinded plant material has a particle size of at the most 240 μm.

It is also preferred that the majority filler particles are relatively small. Accordingly it is preferred that at least 50%, more preferably at least 60%, even more preferably at least 70%, yet more preferably at least 80%, yet more preferably at least 90% of the particles of the filler has a particle size of at the most 660 μm. It is even more preferred that at least 50%, more preferably at least 60%, even more preferably at least 70%, yet more preferably at least 80%, yet more preferably at least 90% of the particles of the filler has a longest cross section which is at the most 660 μm. Thus, the filler may in one embodiment of the invention be finely grinded plant material wherein at least 50%, more preferably at least 60%, even more preferably at least 70%, yet more preferably at least 80%, yet more preferably at least 90% of the particles of said grinded plant material has a particle size of at the most 660 μm.

It is furthermore preferred that the vast majority of the filler particles are small. Accordingly it is preferred that at least 70%, more preferably at least 80%, even more preferably at least 90%, yet more preferably at least 95%, yet more preferably at least 99%, more preferably at least 99.9% of the particles of the filler has a particle size of at the most 2000 μm, preferably at the most 1500 μm, such as at the most 1000 μm, for example at the most 750 μm.

Depending on the starting material, the filler material may be converted into small particles or powder by any useful means. Thus, powders comprising cellulose, for example crystalline cellulose are commercially available (for example from SIGMA-ALDRICH). If the filler material is prepared from plant materials, such as plant fibre, the plant material, such as the plant fibre is preferably finely divided. This may be obtained by optionally drying the plant material, optionally dividing the plant material to smaller pieces using cutting means and finely dividing the plant material or the smaller pieces for example by grinding or milling in order to obtain a powder. Thus, the powder may for example be obtained using a blender and/or a mill and/or a chrusher and/or a grinder, such as for example a jaw crusher, a cone crusher, a gyratory crusher, a roller crusher, an impact crusher, a ball mill, a mortar, a rod mill, an autogenous mill, a semi-autogenous grinding mill, a pebble mill, a hammer mill, a pin mill, a jet mill, a roller mill or a roller press. The plant material may be provided in raw form and then subjected to blending and or milling, thus by way of example straw from cereal may be dried and divided using cutting means, such as a blender and then milled. In a preferred embodiment of the invention the plant material is finely divided using a Pulsewave Resonance Disintegrating Mill, which is available for example from Pulsewave llc, United States.

In one embodiment of the invention the filler is purified cellulose, such as crystalline cellulose, which is commercially available (for example from SIGMA-ALDRICH).

However, the filler material is frequently prepared from a plant material, such as a plant fibre. Thus, it is within the scope of the present invention that the plant fibre and the filler may be derived from the same plant, however, the plant fibre is used as larger elongated pieces usually in the range of 1 to 25 mm, but frequently in the range of 100 µm to 25 mm, wherein the plant fibre is at least 10 times longer than it is wide, whereas the filler is a powder with an average particle size of at the most 750 µm. It is however preferred in certain embodiments that the filler and the plant fibre is obtained from different plants.

When the filler is obtained from a plant any plant comprising tissue with sufficient cellulose may be used as source of the plant fibre. Depending on the nature of the plant various parts of the plant may be used as source of the filler, for example the source of the plant fibre may be stem, leaves, roots or fruits.

Preferably, the filler is obtained from a plant selected from the group consisting of Abaca, Bagasse, Bamboo, Banana, Broom root, Cantala, Caroa, China jute, Coir, Cotton, Curaua, Date palm, Flax, Hemp, Henequen, Isora, Istle, Jute, Kapok, Kenaf, Kudzu, Mauritius hemp, Nettle, Oil palm, Piassava, Pineapple, Phormium, Roselle, Ramie, Sansevieria, Sisal, Sponge gourd, Cereals, Sun hemp, Cadillo/urena and Wood. Preferably the filler is obtained by providing any of the aforementioned plants or parts thereof, optionally dividing said plant or part thereof to smaller pieces using cutting means and then milling or grinding said plant or parts thereof or said smaller pieces.

Preferably, the filler is obtained from a plant, which is cereal, preferably a cereal selected from the group consisting of barley, wheat, rye, oat, maize, rice, sorghum, millet, triticale, buckwheat, fonio and quinona. More preferably, the cereal is selected from the groups consisting of barley, wheat, rye, oat, maize and rice, more preferably the cereal is barley. When the filler is obtained from a plant, which is a cereal, it is preferred that the filler is obtained from the part of the plant, which is otherwise not used for human food, i.e. preferably the filler is not obtained from grains. Thus preferably, the filler is obtained from leaves and or stems, more preferably from straw. It is however also possible that the filler may be prepared from grains, preferably from by-products containing grains of parts thereof. Preferably said by-products are products, which are not otherwise used for human food. One preferred by-product is spent grains, which is a by-product of beer production. Depending on the particular beer type, said spent grains may be derived from various cereals, such as barley, rice, wheat, rye or maize. The spent grains may have been malted or they may be unmalted or a mixture of malted and unmalted grains.

If the filler is obtained from any of the plant of Table 1 above, then it is preferred that the filler is obtained from the part of the plants indicated in Table 1.

It should be noted that the polymer material according to the present invention is polymerised from a mixture containing both filler material, plant fibre material and monomers, wherein the filler material is different to the plant fibre material and the filler material is different to the monomer.

Plant Fibre Material and Filler Material

The plant fibre material is prepared by covalently linking to a plant fibre a moiety of the formula

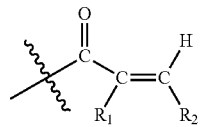

wherein $R_1$ is selected from the group consisting of —H, lower alkyl, lower alcohols, lower alkoxy, lower ethers, lower alkenyl, halogen and lower alkyl substituted with halogen and $R_2$ is selected from the group consisting of —H, lower alkyl, lower alcohols, lower alkoxy, lower ethers, lower alkenyl, halogen and lower alkyl substituted with halogen, to any of the plant fibres described herein above in the section "Plant fibre".

The filler material is prepared by covalently linking to a filler to a moiety of the formula

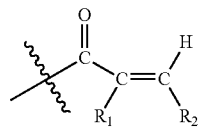

wherein $R_1$ is selected from the group consisting of —H, lower alkyl, lower alcohols, lower alkoxy, lower ethers, lower alkenyl, halogen and lower alkyl substituted with halogen and $R_2$ is selected from the group consisting of —H, lower alkyl, lower alcohols, lower alkoxy, lower ethers, lower alkenyl, halogen and lower alkyl substituted with halogen, to any of the fillers described herein above in the section "Filler".

In preferred embodiments of the invention both the filler and the plant fibre comprises cellulose, which comprises several free —OH groups and the moiety of formula

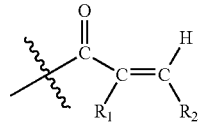

is preferably linked to said filler or plant fibre by formation of an ester linkage between the —OH group of cellulose and the carbonyl of the moiety of the formula

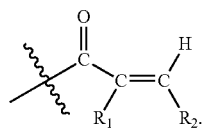

Such an ester linkage between an —OH group of cellulose and a carbonyl is herein also denoted as —O-linked carbonyl.

The filler may be linked to a compound of the same formula as the plant fibre or to a different compound. If more than one filler and/or more than one plant material is used they may be covalently linked to a compound of the same formula or to different compounds. Thus, the compound to which filler(s) and/or plant fibre(s) are covalently linked may independently be selected from the group consisting of moieties of the formula

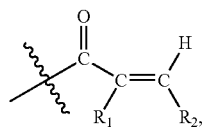

wherein $R_1$ and $R_2$ independently are selected from the group consisting of —H, lower alkyl, lower alcohols, lower alkoxy, lower ethers, lower alkenyl, halogen and lower alkyl substituted with halogen. Preferably, lower alkyl is $C_{1-6}$ alkyl, more preferably $C_{1-3}$ alkyl, even more preferably $C_{1-2}$ alkyl. The lower alkyl may be linear or branched, however preferably said lower alkyl is linear. Preferably, lower alcohol is $C_{1-6}$ alcohol, more preferably $C_{1-3}$ alcohol, even more preferably $C_{1-2}$ alcohol. Preferably, lower alkoxy is $C_{1-6}$ alkoxy, more preferably $C_{1-3}$ alkoxy, even more preferably $C_{1-2}$ alkoxy. Preferably, lower ether is $C_{1-6}$ ether, more preferably $C_{1-3}$ ether, even more preferably $C_{1-2}$ ether. The lower ether may comprise one or more —O—, preferably 1 or 2 —O—, even more preferably one —O—, wherein the —O— may be positioned at any position within the ether.

Preferably, $R_1$ and $R_2$ are independently selected from the group consisting of —H and lower alkyl, more preferably from the group consisting of —H and $C_{1-6}$ alkyl, even more preferably from the group consisting of —H, methyl and ethyl.

In a very preferred embodiment $R_1$ is methyl and $R_2$ is —H.

Covalently linking filler and plant fibre may independently be performed using several different methods.

In a preferred method, this is undertaken as a gas phase reaction, wherein the filler and/or plant fibre is provided in solid state and a compound of the formula

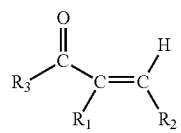

is provided in gas phase. $R_1$ and $R_2$ of said compounds are as described herein above in the present section and $R_3$ may be selected from the group consisting of linear and branched alkyl, alkenyl, alkoxy, ethers, aliphatic ring optionally comprising heteroatoms, alcohols, halide, alkyl substituted with halogen and —H. Preferably, $R_3$ is halide or alkyl halide, more preferably halide, even more preferably chloride.

Thus, the method preferably comprising the steps of
a) providing a compound comprising cellulose
b) providing a compound of the formula

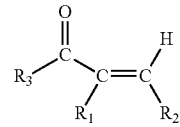

wherein $R_1$, $R_2$ and $R_3$ are as defined herein above in the present section;

c) contacting said compound comprising cellulose with said compound of the formula

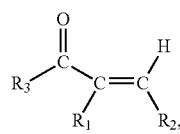

wherein said compound is kept in gas phase.

The compound comprising cellulose may be a filler in which case the method results in a filler material. The compound comprising cellulose may also be a plant fibre in which case the method results in a plant fibre material.

Preferably said compound comprising cellulose (for example the plant fibre and/or the filler) is kept in the solid state.

It is preferred that the reaction takes place at a temperature in the range of 50 to 110° C., preferably in the range of 60 to 100° C., more preferably in the range of 70 to 90° C., even more preferably in the range of 75 to 85° C., yet more preferably in the range of 78 to 82° C., for example around 80° C., such as at 80° C., for example in the range of 50 to 100° C., such as in the range of 60 to 100° C. for example in the range of 70 to 100° C., such as in the range of 75 to 100° C. for example in the range of 50 to 90° C., such as in the range of 60 to 90° C., for example in the range of 75 to 90° C. In order for the reaction to take place at the aforementioned preferred temperatures, it is preferred that the compound comprising cellulose (for example the filler and/or the plant fibre) is kept at said temperature. This may be achieved by any suitable method known to the skilled person for example by placing the compound comprising cellulose (for example the filler and/or the plant fibre) in a sand bath with the desired temperature.

The compound of formula

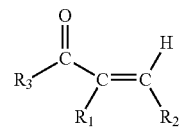

may be kept in gas phase by any suitable method known to the skilled person. For example the compound may be subjected to heating, for example the compound of formula

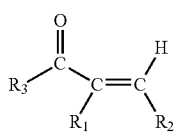

may be kept at a temperature of in the range of 40 to 100° C., such as in the range of 50 to 100° C., for example in the range of 55 to 100° C., such as in the range of 40 to 90° C., for example in the range of 50 to 90° C., such as in the range of 55 to 90° C., for example in the range of 40 to 80° C., such as in the range of 50 to 80° C., for example in the range of 55 to 80° C., such as in the range of 40 to 70° C., preferably in the range of 50 to 70° C., more preferably in the range of 55 to 70° C., for example in the range of 40 to 65° C., such as in the range of 50 to 65° C., yet more preferably in the range of 55 to 65° C., even more preferably in the range of 58 to 62° C., yet more preferably around 60° C., such as at 60° C.

The compound comprising cellulose should be contacted with the compound of formula

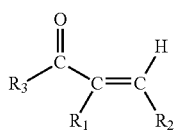

for sufficient time to allow the reaction to occur, preferably the compound comprising cellulose is contacted with the compound of formula

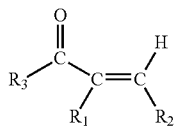

for in the range of 1 to 50 hours, preferably in the range of 2 to 25 hours, more preferably in the range of 3 to 15 hours, even more preferably in the range of 4 to 10 hours, yet more preferably in the range of 5 to 7 hours, even more preferably for approximately 6 hours, such as for 6 hours.

In addition, in order to contact the compound comprising cellulose with the compound of formula

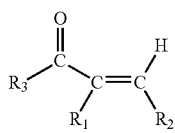

in gas phase it may be useful to employ a carrier gas, which preferably is an inert gas, more preferably a noble gas, for example argon.

A non-limiting example of a useful method for covalently linking a compound comprising cellulose to a compound of formula

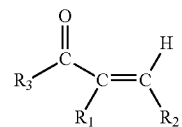

in gas phase is described in Example 5 herein below. The skilled person will appreciate that in the example the compound comprising cellulose is microcrystalline cellulose, however, the method may equally well be performed using any other of the fillers described herein above in the section "Filler" or any of the plant fibres described herein above in the section "Plant fibre". Similarly, the skilled person will appreciate that in the example the compound of formula

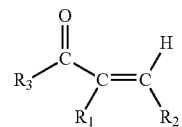

is methacryloyl chloride, however, the method may equally well be performed using any other of the compounds of formula

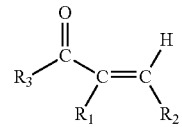

described herein above in this section.

The filler and/or the plant fibre may also be covalently linked to the moiety of formula

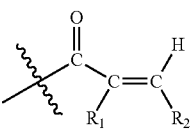

in solution. Such methods in general comprise the steps of
  a) providing a filler and/or plant fibre
  b) adding a solvent to said filler and/or plant fibre
  c) adding a compound of formula

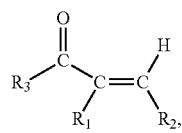

wherein $R_1$, $R_2$ and $R_3$ are as described herein above in this section
  d) incubating the mixture under conditions allowing formation of ester bonds between the cellulose of the filler and/or plant fibre and the compound The filler may be any of the fillers described herein above in the section "Filler" and the plant fibre may be any of the plant fibre described herein above in the section "Plant fibre".

The solvent may be any useful solvent, wherein an ester bond can be formed between the cellulose within the filler and/or plant fibre and the compound of formula

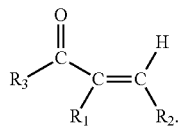

Preferably, the solvent is an organic solvent. The solvent may also be a mixture of different solvent, preferably a mixture of organic solvents. The organic solvents may for example be a short alkane or a short alkane substituted with one or more halogens or a short alkane substituted with one or more —OH groups, preferably substituted with only one —OH group. In this context a short alkane is a C1 to C4 alkane, preferably a C1 alkane. The halogens may be any halogen, preferably chloride and the alkane may be substituted with one or more, for example with 2 halogens, such as with two chlorides. Thus, the solvent may for example be dichloromethane (DCM), ethanol or N,N' Dimethylacetamide (DMA), preferably DCM or DMA. The solvent preferably comprises a basic solvent, such as a solvent comprising an amine, such as a tertiary amine. An example of such a solvent is triethylamine (TEA). Preferably, the solvent is a mixture of a solvent comprising a halogen and a basic solvent, such as a mixture of DMA and TEA.

The plant fibre or filler may be pretreated prior to incubation with the compound of formula

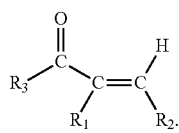

In particular, when the solvent used is ethanol, then it is preferred that the plant fibre or filler is pretreated prior to incubation with the compound of formula

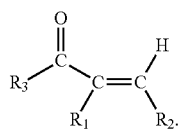

The pretreatment is preferably incubation with a base, such as a strong base, preferably with an alkoxide, even more preferably with an ethoxide, such as sodium ethoxide (also denoted NaOEt herein) or the strong base may be an alkaline metal hydroxide, such as NaOH. Said strong base (e.g. alkoxide, such as NaOEt) is preferably provided in a useful solvent. Said useful solvent may preferably be a lower alcohol, more preferably ethanol or methanol, yet more preferably ethanol or the solvent may be water. The strong base may be provided in any useful concentration, such as in the range of 0.05 to 10%, for example in the range of 0.1 to 5%, such as in the range of 0.1 to 1%. The incubation with said base may in one preferred embodiment be performed at least partly under microwave irradiation preferably with stirring, for example under microwave irradiation for in the range of 1 to 60 min, preferably for in the range of 5 to 60 min, more preferably for in the range of 5 to 50 min, even more preferably for in the range of 5 to 40 min, yet more preferably for in the range of 5 to 30 min, yet more preferably for in the range of 10 to 30 min, for example for 10 to 20 min. at a temperature of in the range of 40 to 130° C., preferably in the range of 50 to 120° C., more preferably in the range of 60 to 110° C., even more preferably in the range of 70 to 100° C., preferably in the range of 70 to 90° C., yet more preferably in the range of 75 to 85° C., such as at 80° C.

After said pre-treatment the treated filler material and/or plant fibre material may be recovered and optionally washed in solvent, such as water and optionally dried.

Conditions allowing formation of ester bonds between the cellulose of the filler and/or plant fibre and the compound may be any useful conditions known to the skilled person. Preferably the conditions involve incubation for in the range of 1 to 100 hours, such as in the range of 5 to 100 hours, for example in the range of 8 to 100 hours, such as in the range of 8 to 80 hours, for example in the range of 8 to 60 hours, such as in the range of 8 to 50 hours, for example in the range of 8 to 40 hours, such as in the range of 8 to 30 hours, for example in the range of 8 to 24 hours, such as in the range of 8 to 20 hours, for example in the range of 8 to 15 hours, such as in the range of 10 to 14 hours, for example in the range of 11 to 13 hours, such as for around 12 hours at a temperature in the range of 10 to 40° C., such as in the range of 10 to 30° C., for example in the range of 10 to 25° C., such as in the range of 15 to 40° C., for example in the range of 20 to 40° C., such as in the range of 25 to 40° C., for example in the range of 20 to 30° C., such as in the range of 20 to 28° C., for example in the range of 20 to 26° C., such as in the range of 20 to 24° C., for example around 22° C.

In one embodiment it is preferred that step d) above comprises microwave irradiation preferably under stirring, such as microwave irradiation for in the range of 1 to 60 min, preferably for in the range of 5 to 60 min, more preferably for in the range of 5 to 50 min, even more preferably for in the range of 5 to 40 min, yet more preferably for in the range of 5 to 30 min, yet more preferably for in the range of 5 to 20 min, for example for in the range of 10 to 20 min., such as for 20 min. at a temperature of in the range of 50 to 150° C., preferably in the range of 60 to 140° C., more preferably in the range of 70 to 130° C., even more preferably in the range of 80 to 120° C., preferably in the range of 90 to 110° C., yet more preferably in the range of 90 to 100° C., such as at 95° C.

A preferred non-limiting example of a method of linking a moiety of formula

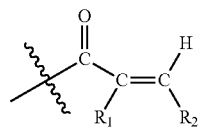

to a filler and/or plant fibre is given in Example 1.

The degree of —O-linking is herein used to denote to what extend a compound comprising cellulose is covalently linked to a moiety of formula

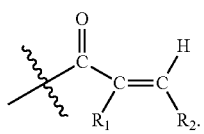

Preferably, the degree of —O-linking is determined by a fluorescence based method, wherein double bonds are allowed to react with a free thiol group on a fluorescent dye. Difference of fluorescence between the compound comprising cellulose (for example filler and/or plant fibre) before reaction with the compound of formula

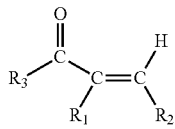

and the fluorescence of the compound comprising cellulose covalently —O-linked to

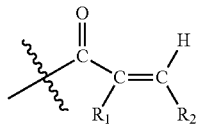

(for example the filler material or the plant fibre material) is then used as a measure of the degree of —O-linking.

Preferably, the fluorescence of the compound comprising cellulose covalently —O— linked to

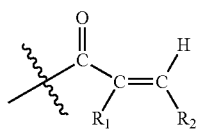

(for example the filler material or the plant fibre material) is at least 1.2 times higher, more preferably at least 1.3 times higher, even more preferably at least 1.4 time higher, yet more preferably at least 1.5 times higher, even more preferably at least 2 times higher, yet more preferably at least 2.4 times higher, such as at least 4 times higher, for example at least 5 times higher, such as at least 6 times higher, for example at least 7 times higher, such as at least 8 times higher, for example at least 9 times higher, such as at least 10 times higher, such as in the range of 1.4 to 3 times higher, preferably in the range of 1.4 to 20 times higher, more preferably in the range of 2 to 20 times higher, yet more preferably in the range of 2.4 to 20, for example in the range of 5 to 20 times higher, such as in the range of 7 to 20, for example in the range of 9 to 20 times higher, preferably in the range of 2 to 15 times higher, even more preferably in the range of 2.4 to 12 times higher, such as in the range of 2 to 5 times higher than the fluorescence between the compound comprising cellulose (for example filler and/or plant fibre) before reaction with the compound of formula

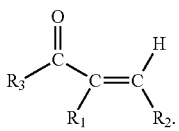

Preferably, the fluorescent dye may be any fluorescent dye comprising a thiol group, but in a preferred method the fluorescent dye is a cys-reactive rhodamine, preferably RMA1118-69 as described herein below in Example 6.

A suitable method for determining the degree of —O-linking employing the use of RMA1118-69 is described in Example 6 herein below.

The filler material to be used with the present invention preferably has a minimal degree of —O-linking. Thus it is preferred that the filler material to be used with the present invention has a fluorescence, which is at least 1.2 times higher, more preferably at least 1.3 times higher, even more preferably at least 1.4 time higher, yet more preferably at least 1.5 times higher, even more preferably at least 2 times higher, yet more preferably at least 2.4 times higher, such as at least 4 times higher, for example at least 5 times higher, such as at least 6 times higher, for example at least 7 times higher, such as at least 8 times higher, for example at least 9 times higher, such as at least 10 times higher, for example in the range of 1.2 to 10 times higher, such as in the range of 1.3 to 10 times higher, for example in the range of 1.4 to 10 times higher, such as in the range of 1.5 to 10 times higher, for example in the range of 1.2 to 5 times higher, such as in the range of 1.3 to 5 times higher, for example in the range of 1.4 to 5 times higher, such as in the range of 1.5 to 5 times higher, for example in the range of 1.2 to 3 times higher, such as in the range of 1.3 to 3 times higher, for example in the range of 1.4 to 3 times higher, such as in the range of 1.5 to 3 times higher, for example in the range of 1.2 to 2.25 times higher, such as in the range of 1.3 to 2.25 times higher, for example in the range of 1.4 to 2.25 times higher, such as in the range of 1.5 to 2.25 times higher, preferably in the range of 1.4 to 20 times higher, more preferably in the range of 2 to 20 times higher, yet more preferably in the range of 2.4 to 20, such as in the range of 5 to 20 times higher, for example in the range of 7 to 20, such as in the range of 9 to 20 times higher, preferably in the range of 2 to 15 times higher, even more preferably in the range of 2.4 to 12 times higher, such as in the range of 2 to 5 times higher than the fluorescence of the filler, which is not linked to a moiety of formula

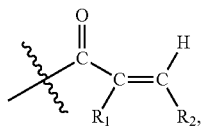

when determined as described herein below in Example 6. The filler, which has not been reacted with a compound of formula

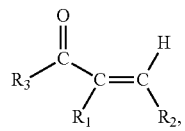

may also be referred to as filler standard in the context. The filler standard is preferably of the same structure as the filler material except that the filler standard lacks the moiety of the formula

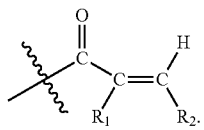

The plant fibre material to be used with the present invention preferably has a minimal degree of —O-linking. Thus it is preferred that the plant fibre material to be used with the present invention has a fluorescence, which is at least 1.2 times higher, more preferably at least 1.3 times higher, even more preferably at least 1.4 time higher, yet more preferably at least 1.5 times higher, even more preferably at least 2 times higher, yet more preferably at least 2.4 times higher, such as at least 4 times higher, for example at least 5 times higher, such as at least 6 times higher, for example at least 7 times higher, such as at least 8 times higher, for example at least 9 times higher, such as at least 10 times higher, for example in the range of 1.2 to 10 times higher, such as in the range of 1.3 to 10 times higher, for example in the range of 1.4 to 10 times higher, such as in the range of 1.5 to 10 times higher, for example in the range of 1.2 to 5 times higher, such as in the range of 1.3 to 5 times higher, for example in the range of 1.4 to 5 times higher, such as in the range of 1.5 to 5 times higher, for example in the range of 1.2 to 3 times higher, such as in the range of 1.3 to 3 times higher, for example in the range of 1.4 to 3 times higher, such as in the range of 1.5 to 3 times higher, for example in the range of 1.2 to 2 times higher, such as in the range of 1.3 to 2 times higher, for example in the range of 1.4 to 2 times higher, such as in the range of 1.5 to 2 times higher, for example in the range of 1.5 to 1.75 times higher, preferably in the range of 1.4 to 20 times higher, more preferably in the range of 2 to 20 times higher, yet more preferably in the range of 2.4 to 20, for example in the range of 5 to 20 times higher, such as in the range of 7 to 20, for example in the range of 9 to 20 times higher, preferably in the range of 2 to 15 times higher, even more preferably in the range of 2.4 to 12 times higher, such as in the range of 2 to 5 times higher than fluorescence of the plant fibre, which is not linked to a moiety of formula

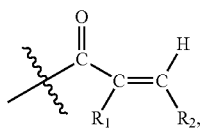

when determined as described herein below in Example 6. The plant fibre, which has not been reacted with a compound of formula

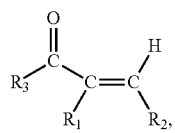

may also be referred to as plant fibre standard in the context. The plant fibre standard is preferably of the same structure as the plant fibre material except that the plant fibre standard lacks the moiety of the formula

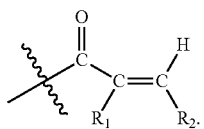

Monomer

The polymer material according to the invention is polymerised from a pre-polymerisation mixture comprising at least a filler material, preferably also at least one plant fibre material (both of which are described in more detail herein above in the section "Plant fibre material and filler material" and preferably also at least one monomer an optionally at least one cross-linker.

The monomer is a compound of the formula

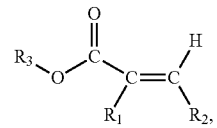

or of the formula

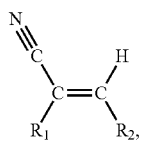

wherein $R_1$, $R_2$ and $R_3$ are as described in the following:
Preferably the monomer is a compound of the formula

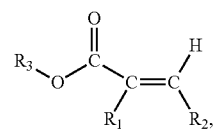

wherein $R_1$, $R_2$ and $R_3$ are as described in the following:

$R_1$ and $R_2$ are independently selected from the group consisting of —H, lower alkyl, lower alcohols, lower alkoxy, lower ethers, lower alkenyl, halogen and lower alkyl substituted with halogen. Preferably, lower alkyl is $C_{1-6}$ alkyl, more preferably $C_{1-3}$ alkyl, even more preferably $C_{1-2}$ alkyl. The lower alkyl may be linear or branched, however preferably said lower alkyl is linear. Preferably, lower alcohol is $C_{1-6}$ alcohol, more preferably $C_{1-3}$ alcohol, even more preferably $C_{1-2}$ alcohol. Preferably, lower alkoxy is $C_{1-6}$ alkoxy, more preferably $C_{1-3}$ alkoxy, even more preferably $C_{1-2}$ alkoxy. Preferably, lower ether is $C_{1-6}$ ether, more preferably $C_{1-3}$ ether, even more preferably $C_{1-2}$ ether. The lower ether may comprise one or more ether bonds, i.e. —O—, preferably 1 or 2 —O—, even more preferably one —O—, wherein the —O— may be positioned at any position within the ether.

Preferably $R_1$ is lower alkyl or —H, more preferably $C_{1-6}$ alkyl or —H, even more preferably $C_{1-3}$ alkyl or —H, yet more preferably $R_1$ is selected from the group consisting of —H, methyl and ethyl, most preferably $R_1$ is methyl or —H.

Preferably $R_2$ is lower alkyl or —H, more preferably $C_{1-6}$ alkyl or —H, even more preferably $C_{1-3}$ alkyl or —H, yet more preferably $R_2$ is selected from the group consisting of —H, methyl and ethyl, most preferably $R_2$ is —H.

$R_3$ is selected from the group consisting of linear and branched alkyl, alkenyl, alkoxy, ethers, aliphatic ring optionally comprising heteroatoms, alcohols, halide, alkyl substituted with halogen and —H. Linear and branched alkyl may preferably be $C_{1-9}$ linear or branched alkyl, more preferably $C_{1-6}$ linear or branched alkyl. Preferred linear or branched alkyl are selected from the group consisting of methyl, ethyl, propyl, butyl, tert-butyl, pentyl and hexyl, more preferably from the group consisting of methyl, ethyl, butyl, tert-butyl and hexyl, even more preferably ethyl. Alkenyl is preferably $C_{2-9}$ alkenyl, even more preferably $C_{2-6}$ alkenyl, yet more preferably $C_{2-3}$ alkenyl. Said alkenyls may comprise one or more double bonds, preferably however, they comprise only one double bond. Preferred alkenyl are selected from the group consisting of —CH=CH$_2$ and —CH$_2$—CH=CH$_2$. Alkoxy is preferably $C_{1-20}$ alkoxy, more preferably $C_{1-15}$ alkoxy, even more preferably $C_{1-10}$ alkoxy, yet more preferably $C_{1-3}$ alkoxy. Ether is preferably $C_{3-10}$ ether, yet more preferably $C_{4-8}$ ether, for example $C_6$ ether. Ethers may comprise one or more ether bonds (—O—), preferably in the range of 1 to 4 —O—, more preferably in the range of 1 to 2 —O—. Preferably ethers are selected from the group consisting of ethers of the general structures —(CH$_2$)$_n$—O—(CH$_2$)$_m$—CH$_3$ and —(CH$_2$)$_n$—O(—CH$_2$)$_p$—O—(CH$_2$)$_m$—CH$_3$, wherein n and p individually are integers in the range of 1 to 8, preferably in the range of 1 to 5, even more preferably 2 and m is an integer in the range of 0 to 8, more preferably in the range of 0 to 5, even more preferably in the range of 1 to 3. Examples of preferred ethers include —(CH$_2$)$_2$—O—(CH$_2$)$_3$—CH$_3$ and —(CH$_2$)$_2$—O(—CH$_2$)$_2$—O—(CH$_2$)$_1$—CH$_3$. Aliphatic rings are preferably in the range of 5 to 8 membered rings, more preferably 5 to 6 membered rings, preferably 6 membered rings. The aliphatic ring may comprise atoms selected from the group consisting of C, N, O and S, preferably selected from the group consisting of C, O and N. A preferred aliphatic ring according to the invention is a sugar, preferably a mono-saccharide, such as glucose, maltose, mannose or galactose. Another example of a useful aliphatic ring is a morpholine ring. Other preferred aliphatic rings are benzyl and phenyl. Alcohols are preferably $C_{1-9}$ alcohols, more preferably $C_{1-6}$ alcohols, yet more preferably $C_{1-4}$ alcohols. It is preferred that alcohols are alkyl-OH, and thus alcohols are preferably $C_{1-9}$ alkyl-OH, more preferably $C_{1-6}$ alkyl-OH, yet more preferably $C_{1-4}$ alkyl-OH, wherein the —OH group may be positioned at any position within the alkyl, however, preferably at the terminal position. Examples of preferred alcohols are —(CH$_2$)$_2$—OH, —(CH$_2$)$_3$—OH and —(CH$_2$)$_4$—OH. Halide may be any halide, preferably chloride. Alkyl substituted with halide may be any of the aforementioned alkyls substituted with one or more halides, preferably with one halide, said halide preferably being chloride.

In a preferred embodiment of the invention $R_3$ of the monomer is selected from the group consisting of methyl, ethyl, butyl, tert-butyl, hexyl, benzyl, phenyl, $C_{12}$-alkyl, $C_{14}$-alkyl, —CH=CH$_2$, —CH$_2$—CH=CH$_2$, —(CH$_2$)$_n$—O—(CH$_2$)$_m$—CH$_3$, —(CH$_2$)$_n$—O—(—CH$_2$)$_p$—O—(CH$_2$)$_m$—CH$_3$, morpholine ring, —(CH$_2$)$_2$—OH—(CH$_2$)$_3$—OH, —(CH$_2$)$_4$—OH and —H.

In a very preferred embodiment of the invention $R_3$ is selected from the group consisting of —H and alkyl, more preferably from the group consisting of —H, methyl and ethyl, even more preferably from the group consisting of —H and ethyl.

In a preferred embodiment of the invention the polymer material is polymerised at least from a filler material, a plant fibre material and one or more monomers, wherein said one or more monomers are selected from the group consisting of ethylmethacrylate, ethylacrylate, acrylic acid, methacrylic acid, Allyl methacrylate, 2-Butoxyethyl methacrylate, tert-Butyl methacrylate, 2-(Dimethylamino)ethyl methacrylate, Hexyl methacrylate, 2-Hydroxyethyl methacrylate, Vinyl methacrylate, 4-Acryloylmorpholine, Di(ethylene glycol) 2-ethylhexyl ether acrylate, 4-Hydroxybutyl acrylate and Methacrylic acid, more preferably from the group consisting of ethylmethacrylate, ethylacrylate, acrylic acid and methacrylic acid.

More preferably the polymer material is polymerised at least from a filler material, a plant fibre material and at least two, preferably at least three, such as in the range of 1 to 10, for example in the range of 2 to 10, such as in the range of 3 to 10, for example in the range of 1 to 7, such as in the range of 2 to 7, for example in the range of 3 to 7, such as in the range of 1 to 5, very preferably in the range of 2 to 5, such as in the range of 3 to 5, for example in the range of 1 to 4, yet more preferably in the range of 2 to 4, most preferably in the range of 2 to 3 different monomers of the formula

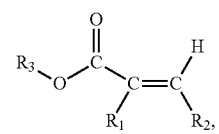

wherein $R_1$, $R_2$ and $R_3$ are as described herein above in this section. Preferably all of said monomers are selected from the group consisting of ethylmethacrylate, ethylacrylate, acrylic acid, methacrylic acid, Allyl methacrylate, 2-Butoxyethyl methacrylate, tert-Butyl methacrylate, 2-(Dimethylamino) ethyl methacrylate, Hexyl methacrylate, 2-Hydroxyethyl methacrylate, Vinyl methacrylate, 4-Acryloylmorpholine, Di(ethylene glycol) 2-ethylhexyl ether acrylate, 4-Hydroxybutyl acrylate, Methacrylic acid and Lauryl acrylate, more preferably from the group consisting of ethylmethacrylate, ethylacrylate, acrylic acid and methacrylic acid.

In a very preferred embodiment of the invention, the monomers are one or more, preferably two or more, even more preferably in the range of 2 to 4 different monomers selected from the group consisting of Allyl methacrylate, 2-Butoxyethyl methacrylate, tert-Butyl methacrylate, Hexyl methacrylate, 2-Hydroxyethyl methacrylate, 4-Acryloylmorpholine, Di(ethylene glycol) 2-ethylhexyl ether acrylate, 4-Hydroxybutyl acrylate, Methacrylic acid, Ethylmethacrylate, methyl ether acrylate and Acrylonitrile.

Cross-Linker

The polymer material according to the invention is polymerised from a pre-polymerisation mixture comprising at least one filler material and in one embodiment at least one cross-linker.

Thus, in one embodiment of the invention in addition to the plant fibre material and the filler material and the monomers described in detail herein above, the polymer material according to the invention may also be polymerised from a mixture further comprising one or more cross-linkers.

According to the present invention cross-linkers are compounds comprising at least two reactive groups, which are individually capable of reacting with an acrylate group, for example with methacrylate.

Preferred crosslinkers comprise at least two reactive groups selected from the group consisting of acrylate groups. Thus, the crosslinker may be a compound comprising two acrylate groups, such as three acrylate groups, for example four acrylate groups, such as five acrylate groups, such as more than 5 acrylate groups.

According to this invention an acrylate group is a group of the following structure —(CO)—$CR_1$=$CR_2$—, preferably a methacrylate group.

Preferably, the cross-linker is a sugar moiety covalently O-linked to at least two

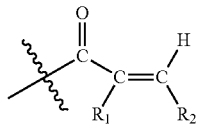

groups, wherein $R_1$ and $R_2$ independently are selected from the group consisting of —H, lower alkyl, lower alcohols, lower alkoxy, lower ethers, lower alkenyl, halogen and lower alkyl substituted with halogen, and wherein said two groups may be identical or different.

Said sugar moiety may be covalently linked to at least two, such as 2, for example 3, such as 4, for example 5, such as more than 5 of said groups, wherein said group may be identical or different.

Preferably each $R_1$ is independently lower alkyl or —H, more preferably $C_{1-6}$ alkyl or —H, even more preferably $C_{1-3}$ alkyl or —H, yet more preferably $R_1$ is selected from the group consisting of —H, methyl and ethyl, most preferably $R_1$ is methyl or —H.

Preferably each $R_2$ is independently lower alkyl or —H, more preferably $C_{1-6}$ alkyl or —H, even more preferably $C_{1-3}$ alkyl or —H, yet more preferably $R_2$ is selected from the group consisting of —H, methyl and ethyl, most preferably $R_2$ is —H.

One example of a preferred cross-linker to be used with the present invention is a cross-linker comprising or preferably consisting of a sugar moiety covalently linked to at least two, such as 2, for example 3, such as 4, for example 5, such as more than 5 acrylate groups as well as salts thereof, preferably alkali salts thereof, such as sodium salts. Preferably at least one and more preferably all of said acrylate groups are methacrylate.

A sugar moiety within the meaning of the above section is a mono-saccharide, a disaccharide or an oligo-saccharide, preferably the sugar moiety is a mono-saccharide, more preferably the sugar moiety is selected from the group consisting of glucose, maltose, mannose and galactose.

Thus, the crosslinker may for example be selected from the group consisting of glucose di-methacrylate, glucose tri-methacrylate, glucose tetra-methacrylate, glucose penta-methacrylate, maltose di-methacrylate, maltose tri-methacrylate, maltose tetra-methacrylate, maltose penta-methacrylate, galactose tri-methacrylate, galactose tetra-methacrylate, galactose di-methacrylate, galactose penta-methacrylate, mannose di-methacrylate, mannose tri-methacrylate, mannose tetra-methacrylate and mannose penta-methacrylate as well as salts thereof, preferably alkali salts thereof, such as sodium salts.

In one preferred embodiment the crosslinker is a compound comprising a sugar moiety covalently linked to acrylate of the following structure including the sodium salt thereof:

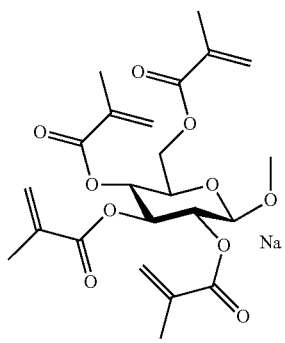

$C_{23}H_{30}O_{10}$
Exact Mass: 466.1839
Mol. Wt.: 466.4783
$C_{23}H_{30}NaO_{10}$
Exact Mass: 489.1737
Mol. Wt.: 489.4681
RMA-173-fr2&3Pk2

Cross-linkers, which are sugar moieties linked to

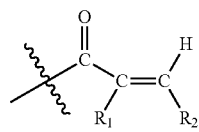

group may be prepared by any useful method, for example by a method comprising incubation of a mixture comprising said sugar and a compound of the formula

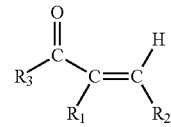

wherein $R_1$ and $R_2$ independently are selected from the group consisting of —H, lower alkyl, lower alcohols, lower alkoxy, lower ethers, lower alkenyl, halogen and lower alkyl substituted with halogen and $R_3$ is selected from the group consisting of linear and branched alkyl, alkenyl, alkoxy, ethers, aliphatic ring optionally comprising heteroatoms, alcohols, halide, alkyl substituted with halogen and —H, preferably $R_3$ is —OH, in the presence of an enzyme capable of catalysing an esterification (such as a dehydration) or a transesterification. Preferably said enzyme capable of catalysing esterification is a lipase, such as a lipase selected from the group consisting of Novozym 435, lipase PC (*Pseudomonas cepacia*), lipase from *Candida Antarctica*, lipase CA or CA lipase B (CALB) immobilized on an acrylic resin and lipase CR (*Candida rugosa*). Preferably said enzyme capable of catalysing transesterification is a lipase, such as a lipase selected from the group consisting of Porcine pancreas lipase (PPL) and *Pseudomonas* sp. lipase (lipase PS).

The mixture comprising said sugar may be any mixture comprising a sugar or its alkyl glycosides, but preferably it is a mixture from a biological source such as molasse or invert sugar syrup. The mixture comprising sugar may also be prepared from any source of starch treated with useful enzymes e.g. alpha and beta-amylases which can be used to produce sugar by starch degradation. The acidic degradation of polysaccharides such as starch with strong acid such as HCl or H2SO4 can also be used for production of sugars or sugar glycosides. The mixture comprising sugar may also be prepared from cellulose using cellulases, which allow the use of celluloses for the production of glucose syrups. The mixture comprising sugar may also be other sugar sources such as cane or beet sugar. All these mixtures comprising sugar may be used for methacryloylation to form molecules that can be used as crosslinkers.

Another example of useful crosslinkers are compounds comprising a branched alkyl covalently linked to at least 2, preferably 3 acrylate groups via ester bonds. One non-limiting example of such a crosslinker is a compound of the structure:

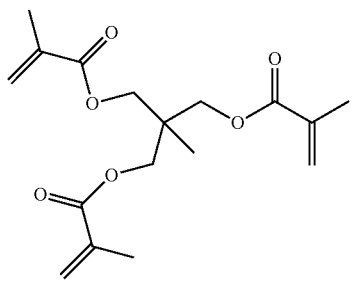 [SMILES: C=C(C)C(=O)OCC(C)(COC(=O)C(=C)C)COC(=O)C(=C)C]

The cross-linker may be added in any useful amount depending on the desired properties of the polymer material.

Preferably the polymer material is co-polymerised from a mixture comprising plant fibre materials, filler materials and monomers in the amount indicated herein above in the section "Ratio" and additionally in the range of 0 to 30%, preferably 0 to 20%, such as in the range of 0 to 15%, for example in the range of 0 to 10%, such as in the range of 0 to 5%, for example in the range 1 to 20%, such as in the range of 1 to 15%, for example in the range of 1 to 10%, such as in the range of 1 to 5% crosslinker. Preferably the amount of cross-linker is at the most 10%, even more preferably at the most 9%.

Ratio

The present invention relates in one embodiment to a polymer material which is a copolymer polymerised at least from
a) one or more filler materials, which may be any of the filler materials described herein above in the section "Plant fibre material and filler materials" and which collectively are referred to as component a); and
b) one or more monomers, which may be any of the monomers described herein above in the section "Monomer" and which collectively are referred to as component b); and
c) one or more plant fibre materials, which may be any of the plant fibre materials described herein above in the section "Plant fibre material and filler materials" and which collectively are referred to as component c).

The invention also relates to a polymer material which is a copolymer polymerised at least from
a) one or more filler materials, which may be any of the filler materials described herein above in the section "Plant fibre material and filler materials" and which collectively are referred to as component a); and
b) one or more monomers, which may be any of the monomers described herein above in the section "Monomer" and which collectively are referred to as component b); and/or
one or more cross-linkers, which may be any of the cross-linkers described herein above in the section "cross-linker" and which collectively are referred to as "cross-linkers";
c) optionally one or more plant fibre materials, which may be any of the plant fibre materials described herein above in the section "Plant fibre material and filler materials" and which collectively are referred to as component c).

The ratio between the individual components may be any useful ratio. In general the ratio is chosen taking the desired properties of the polymer material into consideration.

In this section as well as elsewhere in this document, percentages (%) are given as w/w % if nothing else is indicated.

It is preferred that the polymer material is co-polymerised from a mixture comprising a large percentage plant derived material. Thus, in embodiments of the invention, wherein the filler is plant derived, it is preferred that the polymer material is co-polymerised from a mixture comprising in the range of 5 to 50%, preferably in the range of 10 to 50%, yet more preferably in the range of 15 to 50%, such as in the range of 10 to 40%, for example in the range of 10 to 30%, such as in the range of 15 to 40%, for example in the range of 15 to 30% the plant fibre material and the filler material.

In general it is preferred that the polymer material is co-polymerised from a mixture comprising in the range of 1 to 50%, preferably in the range of 1 to 25%, yet more preferably in the range of 1 to 20%, even more preferably in the range of 1 to 15%, such as in the range of 1 to 10%, for example in the range of 1 to 5%, such as in the range of 2 to 4%, for example in the range of 3 to 4%, such as in the range of 10 to 50%, for example in the range of 10 to 40%, such as in the range of 10 to 30%, for example in the rang of 10 to 25%, yet more preferably in the range of 5 to 40%, even more preferably in the range of 5 to 35%, yet more preferably in the range of 5 to 30%, even more preferably in the range of 5 to 20%, yet more preferably in the range of 3 to 40%, even more preferably in the range of 3 to 35%, yet more preferably in the range of 3 to 30%, even more preferably in the range of 3 to 20% of said plant fibre materials.

It is also preferred that the polymer material is co-polymerised from a mixture comprising in the range of 1 to 60%, preferably in the range of 5 to 50%, yet more preferably in the range of 5 to 30%, even more preferably in the range of 10 to 20%, such as in the range of 1 to 50%, for example in the range of 1 to 40%, such as in the range of 1 to 30%, for example in the range of 1 to 20% such as in the range of 5 to 60%, for example in the range of 5 to 40%, such as in the range of 5 to 30%, for example in the range of 5 to 20%, such as in the range of 10 to 60%, for example in the range of 10 to 50%, such as in the range of 10 to 40%, for example in the range of 10 to 30%, such as in the range of 12 to 20%, for example in the range of 14 to 20%, such as in the range of 16 to 18%, for example in the range of 17 to 18%, such as in the range of 12 to 18%, for example in the range of 14 to 16%, more preferably in the range of 10 to 30%, even more preferably in the range of 15 to 25%, yet more preferably in the range of 10 to 20% of said filler materials.

It is also preferred that the polymer material is co-polymerised from a mixture comprising in the range of 20 to 90%, preferably in the range of 40 to 90%, yet more preferably in the range of 40 to 80%, even more preferably in the range of 40 to 70%, such as in the range of 30 to 90%, for example in the range of 50 to 90%, such as in the range of 60 to 90%, for example in the range of 70 to 90% such as in the range of 80 to 90%, for example in the range of 20 to 80%, such as in the range of 30 to 80%, for example in the range of 50 to 80%, such as in the range of 60 to 80%, for example in the range of 70 to 80%, such as in the range of 20 to 70%, for example in the range of 30 to 80%, such as in the range of 50 to 70%, for example in the range of 60 to 70%, such as in the range of 20 to 60%, for example in the range of 30 to 60%, such as in the range of 40 to 60%, for example in the range of 50 to 60%, such as in the range of 20 to 50%, for example in the range of 30 to 50%, for example in the range of 40 to 50% of said monomers.

In one embodiment it is preferred that the polymer material is co-polymerised from a mixture comprising at the most 80%, preferably at the most 70%, even more preferably at the most 65%, yet more preferably at the most 60% of said plant fibre material and said filler material in total. In this embodiment it is preferred that said mixture comprises at least 20%, more preferably at least 30%, yet more preferably at least 40% of said monomers.

Thus, in one embodiment of the invention the polymer material is polymerised from a mixture comprising in the range of 1 to 5% said plant fibre material, in the range of 10 to 20% of said filler material and in the range of 70 to 80% of said monomers, more preferably from a mixture comprising in the range of 5 to 10% said plant fibre material, in the range of 15 to 25% of said filler material and in the range of 70 to 80% of said monomers.

In another embodiment of the invention the polymer material is polymerised from a mixture comprising in the range of 10 to 20% of said filler material and in the range of 60 to 70% of said monomers.

It is furthermore preferred that the polymer material after polymerisation comprises at much plant derived material as possible. Thus preferably the polymer material comprises at least 50%, more preferably at least 60%, yet more preferably at least 70%, such as in the range of 50 to 90%, preferably in the range of 60 to 90%, more preferably in the range of 70 to 90% polymerised plant fibre material and filler material Methods of Preparing Polymer The polymer material may be prepared by any useful method known to the skilled person.

Preferably, the polymer material is prepared by a method comprising the steps of
  a) providing a filler material with an average particle size of at the most 750 µm, which may be any of the filler materials described herein above in the section "Plant fibre material and filler material";
  b) providing a monomer, which may be any of the monomers described herein above in the section "Monomer" and/or providing at least one cross-linker, which may be any of the cross-linkers described herein above in the section "cross-linker";
  c) optionally providing a plant fibre material, which may be any of the plant fibre materials described herein above in the section "Plant fibre material and filler material";
  d) Mixing said filler material with said monomer and/or said cross-linker and optionally mixing with said plant fibre material and optionally mixing with additional components, preferably in the amounts described herein above in the section "Ratio",
  e) Adding one or more free radical initiators, thereby obtaining a mixture
  f) Optionally transferring the mixture to a mould
  g) Incubating the mixture at a temperature in the range of 30 to 200° C. and/or subjecting the mixture to UV irradiation.

In a preferred embodiment, the polymer material is prepared by a method comprising the steps of
  a) providing a filler material, which may be any of the filler materials described herein above in the section "Plant fibre material and filler material";
  b) providing a monomer, which may be any of the monomers described herein above in the section "Monomer";
  c) providing a plant fibre material, which may be any of the plant fibre materials described herein above in the section "Plant fibre material and filler material";
  d) Mixing said plant fibre material, said filler material, said monomer and optionally additional components, preferably in the amounts described herein above in the section "Ratio",
  e) Adding one or more free radical initiators, thereby obtaining a mixture
  f) Optionally transferring the mixture to a mould
  g) Incubating the mixture at a temperature in the range of 30 to 200° C., such as in the range of 30 to 100° C. and/or subjecting the mixture to UV irradiation.

Steps a), b) and c) of both of the aforementioned methods may be performed simultaneously or sequentially in any order. If more than one plant fibre material, more than one filler, more than one monomer and/or more than one cross-linker is used, then these may individually be added in any order. Thus, by way of example a monomer may be added first, then a filler and then a monomer.

In one embodiment of the invention step a) is performed subsequent to step e).

Said additional components of step d) may for example be one or more of the crosslinkers described in the section "Crosslinkers" herein above. Said additional components may also be one or more solvents, for example water and/or an alcohol, such as ethanol.

In order to initialise the polymerisation it is preferred that one or more free radical initiators is added to the mixture (see step e).

The free radical initiator may be any compound capable of promoting radical polymerization reactions. Preferably, the free radical initiator is a substance comprising one or more bonds that have low bond dissociation energies.

Preferably, the free radical initiators are selected from the group consisting of azo compounds, organic peroxides, inorganic peroxides, TEMED and organic photoinitiators. Thus, the free radical initiators may be selected from the group consisting of TEMED, azo compounds and peroxides, more preferably from the group consisting of azo compounds and peroxides.

One example of preferred free radical initiators are azo compounds. Azo compounds are compounds comprising the group —N=N—. Preferred azo compounds useful as free radical initiators with the present invention may be one or more selected from the group consisting of 1,1'-Azobis(cyclohexanecarbonitrile), 2,2'-Azobis(2-methylpropionitrile), 4,4'-Azobis(4-cyanovaleric acid) and 2,2'-Azobis(2-methylpropionamidine)dihydrochloride, more preferably the free radical initiator may be 2,2'-Azobis(2-methylpropionamidine)dihydrochloride of the formula:

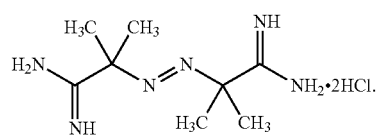

Another very preferred free radical initiator is 1,1'-Azobis(cyclohexanecarbonitrile)

Another example of preferred free radical initiators are peroxides. Peroxides are compounds comprising the group —O—O—. The free radical initiator may be an organic peroxide or an inorganic peroxide.

Preferred organic peroxides useful as free radical initiators with the present invention may be peroxides of the formula $R_1$—O—O—$R_2$, wherein $R_1$ and $R_2$ individually may be selected from the group consisting of aromatic rings (preferably phenyl), linear or branched alkyls (preferably tert-butyl), aromatic rings substituted with alkyl or carbonyl (preferably cumyl or benzoyl) and alkyl carbonyl (preferably Dodecanoyl). Preferably, the organic peroxide may be one or more selected from the group consisting of Dicumyl peroxide, tert-Butyl peroxide, tert-Butyl peroxybenzoate, Cumene hydroperoxide, benzoyl peroxide and Lauroyl peroxide, more preferably the organic peroxide may be one or more selected from the group consisting of lauroyl peroxide and tert-Butyl peroxide, more preferably tert-Butyl peroxide.

Preferred inorganic peroxides useful as free radical initiators with the present invention may be persulphates. Preferably the inorganic peroxide is one or more selected from the group consisting of Hydroxymethanesulfinic acid monosodium salt dehydrate, Potassium persulfate, Sodium persulfate, ammonium persulphate, more preferably the inorganic peroxide is ammonium persulphate.

Yet another preferred example of free radical initiators are organic photoinitiators, which for example may be phenones, such as benzophenones. Preferably the organic photoinitiators are one or more selected from the group consisting of 2-Methylbenzophenone, 3,4-Dimethylbenzophenone, 3-Hydroxybenzophenone, Michler's ketone, 4-(Dimethylamino)benzophenone, 1-Hydroxycyclohexyl phenyl ketone, 2,2-Diethoxyacetophenone, 2-Hydroxy-2-methylpropiophenone, 4'-Hydroxyacetophenone, 4'-tert-Butyl-2',6'-dimethylacetophenone, (4-Bromophenyl)diphenylsulfonium triflate, (4-tert-Butylphenyl)diphenylsulfonium triflate, 10-Methylphenothiazine, 1-Chloro-4-propoxy-9H-thioxanthen-9-one and 2,2-Dimethoxy-2-phenylacetophenone. More preferably the organic photoinitiators are one or more selected from the group consisting of 3,4-Dimethylbenzophenone, 1-Hydroxycyclohexyl phenyl ketone, 10-Methylphenothiazine and 1-Chloro-4-propoxy-9H-thioxanthen-9-one.

Another preferred example of a free radical initiator is TEMED (tetramethylethylenediamine). In embodiments where TEMED is used as a free radical initiator it is preferred that also at least one inorganic peroxide, preferably a persulphate, more preferably ammonium persulphate is also used as a free radical initiator. However, in some embodiments of the invention it is preferred that TEMED is not used as a free radical initiator due to potential toxicity.

It is within the scope of the present invention that more than one free radical initiator may be added in step e), preferably at least 2 different free radical initiators are added, such as 2, for example 3, such as four, for example 5, such as 6 for example more than 6 different free radical initiators may be added in step e). It is preferred that at least two different free radical initiators with different properties are added in step e), for example free radical initiators with different hydrophobicity may be used. By way of example lauroyl peroxide which is hydrophobic and 2,2'-Azobis(2-methylpropionamidine) which is hydrophilic may be used together.

In one embodiment, a hydrobic free radical initiator, such as lauroyl peroxide, a hydrophilic free radical initiator, such as 2,2'-Azobis(2-methylpropionamidine) or 2,2'-Azobis(2-methylpropionamidine)dihydrochloride, a free radical initiator which is an inorganic persulphate, such as ammonium persulphate and TEMED are all added as free radical initiators in step e) of either of above-mentioned methods.

In another preferred embodiment a hydrophilic free radical initiator, such as 2,2'-Azobis(2-methylpropionamidine) or 2,2'-Azobis(2-methylpropionamidine)dihydrochloride and an inorganic persulphate such as ammonium persulphate are added as free radical initiators in step e) of either of above mentioned methods.

In a very preferred embodiment the free radical initiators are one or more, preferably two or more, for example three or more selected from the group consisting of 1,1'-Azobis(cyclohexanecarbonitrile), 2,2'-Azobis(2-methylpropionitrile), 2,2'-Azobis(2-methylpropionamidine)dihydrochloride, tert-Butyl peroxide, Potassium persulfate, Sodium persulfate, 3,4-Dimethylbenzophenone, 10-Methylphenothiazine, 1-Hydroxycyclohexyl phenyl ketone and 1-Chloro-4-propoxy-9H-thioxanthen-9-one. Yet more preferably, the free radical initiators are at least one of, preferably both of 2,2'-Azobis(2-methylpropionamidine)dihydrochloride and ammonium persulphate.

Preferably, the free radical initiators in total constitute in the range of 1 to 10%, more preferably in the range of 1 to 5%, even more preferably in the range of 1 to 3%, yet more preferably in the range of 1.5 to 2% of the mixture. However, it is also possible that less free radical initiator is added, preferably in the range of 1 to 10%0, more preferably in the range of 5 to 10%0 of the mixture.

The mixture may be transferred to a mould. Unless the mixture is prepared directly in a mould, then typically the mixture will be transferred to a mould. If the polymer material is used for preparing a container, the mould would have the shape of said container, for example the shape of a bottle or the shape of a cup.

When the mixture has been transferred to a mould or if no mould is used, after the mixture has been prepared, usually the mixture is heated in order to allow polymerisation. Alternatively or additionally the mixture may be subjected to UV irradiation. In particular, if at least one free radical initiator is an organic photoinitiator, then the mixture is preferably subjected to UV irradiation. It is preferred that the mixture is heated to a temperature in the range of 30 to 200° C., more preferably in the range of 30 to 150° C., yet more preferably in the range of 30 to 125° C., even more preferably a temperature in the range of 30 to 110° C., for example in the range of 30 to 100° C., more preferably in the range of 60 to 200° C., yet more preferably in the range of 60 to 150° C., even more preferably in the range of 60 to 125° C., such as in the range of 60 to 100° C., for example in the range of 60 to 100° C., preferably in the range of 65 to 95° C., more preferably in the range of 70 to 90° C., yet more preferably in the range of 75 to 200°, even more preferably in the range of 75 to 150° C., yet more preferably in the range of 75 to 125° C., even more preferably in the range of 75 to 110° C., for example in the range of 75 to 85° C., for example in the range of 70 to 100° C., such as in the range of 80 to 100° C., for example in the range of 70 to 100° C., such as in the range of 80 to 100° C., for example in the range of 60 to 90° C., such as in the range of 60 to 80° C., for example in the range of 78 to 82° C., such as in the range of 100 to 100° C., such as to approximate 80° C., for example to 80° C., such as to approximately 104° C., for example to 104° C.

The mixture may in one embodiment be heated by slowly raising the temperature to above mentioned temperature, for example the temperature may be raised from ambient to above mentioned temperature over a time of in the range of 1 min to 5 hours, such as in the range of 5 min to 5 hours, for example in the range of 15 min to 5 hours, such as in the range of 15 min to 4 hours, for example in the range of 15 min to 3 hours, such as in the range of 15 min to 2 hours, for example in the range of 15 min to 1 hour.

It is furthermore preferred that the mixture is kept at aforementioned temperature for in the range of 30 min to 24 hours, preferably from in the range of 1 to 15 hours, more preferably from in the range of 1 to 10 hours, even more preferably in the range of 1 to 6 hours, for example in the range of 1 to 3 hours, preferably in the range of 2 to 10 hours, even more preferably in the range of 2 to 6 hours, yet more preferably from in the range of 3 to 6 hours, for example in the range of 3 to 15 hours, such as in the range of 3 to 10 hours.

In a preferred embodiment of the invention step g) also comprises application of pressure to said mixture. The pressure applied is preferably at least 1 ton, preferably at least 2 ton, even more preferably at least 3 ton, yet more preferably at least 4 ton, even more preferably at least 5 ton, such as at least 6 ton, for example in the range of 1 to 15 ton, such as in the range of 1 to 10 ton, for example in the range of 1 to 7 ton, such as in the range of 3 to 15 ton, for example in the range of 3 to 10 ton, such as in the range of 3 to 7 ton, for example in the range of 5 to 15 ton, such as in the range of 5 to 10 ton, for example in the range of 5 to 7 ton. The pressure applied may be dependent on the size of the polymer material to be prepared. Thus it is preferred that the pressure is at least 0.01 ton/cm$^2$ surface area, more preferably at least 0.05 ton/cm$^2$, yet more preferably at least 0.1 ton/cm$^2$, even more preferably 0.5 ton/cm$^2$, yet more preferably at least 1 ton/cm$^2$, such as in the range of 0.01 to 200 ton/cm$^2$, for example in the range of 0.05 to 200 ton/cm$^2$, such as in the range of 0.1 to 200 ton/cm$^2$, for example in the range of 0.5 to 200 ton/cm$^2$, such as in the range of 1 to 200 ton/cm$^2$. The pressure may be applied gradually.

After the heating, the polymer material is usually allowed to cool, where after it is in general ready to use.

Properties of the Polymer Material

Biodegradability

Due to the high content of plant fibre and filler prepared from plant materials, the polymer material according to the invention is in general biodegradable. It is thus very preferred that the polymer material according to the invention is biodegradable as determined by at least one of the methods, preferably two or more of the methods described herein below.

In order for the polymer to be biodegradable it is preferred that a substantial part of the material used for polymerisation is plant fibre material and/or filler material derived from plant fibres. Preferred ratios of the individual polymer constituents used for polymerisation of the polymers of the invention are described herein above in the section "Ratio".

One useful method for determining biodegradability is incubation of the polymer material with a fresh sample of sewage sludge for a predetermined period of time. The $CO_2$ recovery is determined and compared to the theoretically possible $CO_2$. One example of such a method is described herein below in Example 7a. It is preferred that the polymer material according to the invention is biodegradable as determined by the test for biodegradability as described in Example 7a, and thus when subjecting the polymer material of the invention to the test of Example 7a then preferably at least at least 30%, more preferably at least 40%, even more preferably at least 50%, yet more preferably at least 60% of the theoretically possible $CO_2$ is recovered after 30 days of incubation.

Another useful method for determining biodegradability is incubation of the polymer material with a mixture of sand, soil and compost matrix for a predetermined period of time. The $CO_2$ recovery is determined and compared to the theoretically possible $CO_2$. One example of such a method is described herein below in Example 7b. It is preferred that the polymer material according to the invention is biodegradable as determined by the test for biodegradability as described in Example 7b, and thus when subjecting the polymer material of the invention to the test of Example 7b then preferably at least at least 30%, more preferably at least 40%, even more preferably at least 50%, yet more preferably at least 60% of the theoretically possible $CO_2$ is recovered after 60 days of incubation.

A preferred test method for determining biodegradability is incubation of the polymer material with an inoculum that is derived from compost from municipal solid waste. The inoculum is preferably a sample of compost from municipal solid waste. The polymer material is preferably incubated with the inoculum for a predetermined amount of time, preferably for 45 days. The $CO_2$ recovery is determined and compared to the theoretically possible $CO_2$. One example of such a method is described herein below in Example 7c. It is preferred that the polymer material according to the invention is biodegradable as determined by the test for biodegradability as described in Example 7c. Thus when subjecting the polymer material of the invention to the test of Example 7f then the recovery rate of $CO_2$ (i.e. % $CO_2$ recovered of total possible) is preferably at least at least 30%, more preferably at least 40%, even more preferably at least 50%, yet more preferably at least 60%, even more preferably at least 70%, yet more preferably at least 80% of the recovery rate of $CO_2$ of the positive control, wherein the positive control is selected from the group consisting of cellulose, starch, oak, maple, corn leaves and craft paper.

Another very preferred test for biodegradability according to the present invention is a soil burial test. In this test a sample is buried in natural soil outdoors and incubated for a predetermined amount of time. After incubation the weight of the sample is determined. Preferably, said weight is determined after cleaning and drying of said sample. Cleaning may for example be thorough rinsing with water. Drying may for example be incubation at an elevated temperature, such as a temperature of in the range of 60 to 80° C., such as in the range of 65 to 75° C., for example at 70° C. for in the range of 1 to 5 hours, such as in the range of 1 to 3 hours, for example for 2 hours. It is preferred that the polymer material according to the present invention looses weight over time during incubation in soil. Thus preferred polymer materials according to the invention have lost at least 5%, more preferably at least 10%, such as at least 15%, for example in the range of 5 to 25%, such as in the range of 5 to 20%, such as in the range of 10 to 25%, for example in the range of 10 to 20% of the initial weight after incubation for 8 months in natural soil outdoors. It is also preferred that the polymer materials according to the invention have lost at least 5%, more preferably at least 10%, even more preferably at least 15%, yet more preferably at least 20%, even more preferably at least 25%, for example in the range of 5 to 50%, such as in the range of 5 to 40%, such as in the range of 10 to 50%, for example in the range of 10 to 40%, such as in the range of 20 to 50%, for example in the range of 20 to 40%, such as in the range of 25 to 35% of the initial weight after incubation for 15 months in natural soil outdoors. Said natural soil is preferably ordinary garden mould.

Strength

It is preferred that the polymer material of the invention is strong. The amount of plant fibre material and/or filler material used for polymerisation is important for acquiring a desired strength. Preferred amounts of plant fibre material and/or filler material are described herein above in the section "Ratio". Also the size of the filler is of importance and in this regard it is preferred that a filler with a small particle size is used. Preferred particle size of the filler is described herein above in the section "Filler". In addition, the degree of O-linking of the plant fibre material and/or the filler material may influence the strength of the polymer material and accordingly it is preferred that a plant fibre material and a filler material with a sufficient degree of O-linking is used. Preferred degree of O-linking of the filler material and the plant fibre material is described in the section "Plant fibre material and filler material".

Preferably, the polymer material can withstand a pressure of at the most 5 bars, preferably of at the most 7 bars, more preferably at the most 9 bars, yet more preferably of at the most 10 bars, such as in the range of 1 to 10 bars, for example in the range of 5 to 10 bars, such as in the range of 8 to 10 bars, for example in the range of 9 to 11 bars, such as 10 bars. Preferably the polymer material can withstand aforementioned pressure at a temperature in the range of 0 to 40° C., preferably at a temperature in the range of 5 to 35° C., more preferably at a temperature in the range of 10 to 30° C., even more preferably at a temperature in the range of 15 to 25° C., yet more preferably at a temperature of 20° C. In addition it is preferred that the polymer material can withstand aforementioned pressure for at least 10 sec, more preferably for at least 30 sec, even more preferably for at least 60 sec, such as for in the range of 10 to 120 sec. for example for in the range of 30 to 90 sec., such as for in the range of 50 to 70 sec., for example for 60 sec. without breaking.

In particular, when the polymer material is shaped as a bottle, it is preferred that said bottle can withstand a pressure of at the most 5 bars, preferably of at the most 7 bars, more preferably at the most 9 bars, yet more preferably of at the most 10 bars, at a temperature in the range of 5 to 35° C., more preferably at a temperature in the range of 10 to 30° C., even more preferably at a temperature in the range of 15 to 25° C., yet more preferably at a temperature of 20° C. for at least 10 sec, more preferably for at least 30 sec, even more preferably for at least 60 sec, such as for in the range of 10 to 120 sec. for example for in the range of 30 to 90 sec., such as for in the range of 50 to 70 sec., for example for 60 sec. of 20° C. for 60 sec. without leaking. In this context "leaking" means that the bottle cannot keep a content of water or similar liquids.

It is also preferred that the tensile strength of the polymer material is high. Using above described plant fibre material and/or filler material and monomers and/or cross-linkers in the described ratios may lead to polymer materials with useful tensile strength. Thus, preferably, the tensile modulus G of the polymer material is at least 50 MPa, more preferably at least 60 MPa, even more preferably at least 70 MPa, for example at least 80 MPa, such as at least 85 MPa, for example in the range of 50 to 200 MPa, more preferably in the range of 60 to 200 MPa, even more preferably in the range of 70 to 200 MPa, for example in the range of 80 to 200 MPa, such as in the range of 85 to 200 MPa when determined using Hounsfield Test Equipment as described in Example 8 herein below.

It is also preferred that the polymer material has a tensile strength of at least 9 MPa, preferably at least 10 MPa, more preferably at least 15 MPa, yet more preferably at least 20 MPa, even more preferably at least 25 MPa, for example at least 27 MPa, such as in the range of 9 to 100 MPa, for example in the range of 15 to 100 MPa, such as in the range of 25 to 100 MPa.

It is also preferred that the strength of the polymer material according to the invention is at least 9 MPa, preferably at least 10 MPa, more preferably at least 20 MPa, even more preferably at least 25 MPa, for example at least 27 MPa, such as at least 29 MPa, for example in the range of 10 to 200 MPa, more preferably in the range of 20 to 200 MPa, even more preferably in the range of 25 to 100 MPa, for example in the range of 28 to 100 MPa, such as in the range of 29 to 100 MPa when determined using Hounsfield Test Equipment as described in Example 8 herein below.

Furthermore, it is preferred that the storage modulus E' of the material is sufficiently high. The storage modulus E' is also an indicator of the strength of the material and above mentioned factors are also relevant for achieving a polymer material with a useful storage modulus E'. Using above described filler material of the described small particle size and optionally the above described plant fibre material and the monomers and/or cross-linkers, preferably in the described ratios may lead to polymer materials with useful storage modulus E'. Preferably, the storage modulus E' is at least 2500, more preferably at least 3000, for example at least 3200, such as at least 3300, for example at least 3400 Mpa at a temperature of in the range of −40° C. to −30° C., preferably in the range of −37° C. to −32° C. It is also preferred that the storage modulus E' is at least 3000, more preferably at least 4000, even more preferably at least 5000, yet more preferably at least 6000, even more preferably at least 7000, yet more preferably at least 7500, even more preferably at least 8000 MPa at a temperature of in the range of 20° C. to 30° C., preferably in the range of 23° C. to 27° C., such as at 25° C. It is furthermore preferred that the storage modulus E' is at least 5000, more preferably at least 7000, even more preferably at least 8000, yet more preferably at least 9000, even more preferably at least 10,000, yet more preferably at least 11,000, even more preferably at least 11,500 MPa at a temperature of in the range of −45° C. to −55° C., preferably in the range of −48° C. to −52° C., such as at −50° C.

Barrier Property

One major advantage of the polymer material according to the invention is that it has low permeability to gasses and/or liquids, preferably the polymer material is impermeable to gasses and/or water.

This property of the material is achieved by polymerising the filler material described above with the monomers and/or cross-linkers as described above and potentially with the plant fibre material described above. In particular, the preferred filler materials, monomers, cross-linker and plant fibre materials used in the preferred ratios may be used for preparing a polymer material with low or no permeability to gasses and/or water.

Containers prepared from the polymer material are preferably used for storage of liquids. Accordingly, it is preferred that the polymer material only has a limited water intake when soaked in water. Preferably, the water intake (herein also referred to as the water swelling) is at the most 30%, even more preferably at the most 20%, yet more preferably at the most 10%, such as at the most 8%, for example at the most 5%. The water intake may be determined by any suitable method. However preferably it is determined by soaking the dry polymer material in water at ambient temperature (for example at 20° C.) for 24 hours.

Furthermore it is preferred that the polymer has low permeability to water or more preferably is impermeable to water. Water permeability may be determined by placing a disc prepared from the polymer material so that it separates two chambers and sealing off the edges of the disc to ensure that no water can pass at the edge of said disc. Water is filled into one chamber and optionally a pressure is applied. Then it is incubated for a given amount of time and water recovery in the second chamber is determined. Preferably, no detectable water can be recovered in the second chamber.

It is also preferred that the polymer has low permeability or preferably is essentially impermeable to one or more gasses, such as $CO_2$. Thus it is preferred that the polymer material is essentially impermeable to $CO_2$, preferably impermeable to $CO_2$. Thus, it is preferred that the polymer material has a permeability to $CO_2$ which is similar to or lower than that of PET with a similar thickness. Permeability to $CO_2$ may be determined by any suitable method known to the person skilled in the art. However, preferably it is determined by placing a disc or another flat specimen prepared from the polymer material so that it separates two chambers and sealing off the edges of the disc or the specimen to ensure that no $CO_2$ can pass at the edge of said disc or specimen. $CO_2$ is filled into one chamber and optionally a pressure is applied. After incubation for a given amount of time, $CO_2$ is measured in the other chamber. Said $CO_2$ may be filled into said one chamber by filling the chamber with a solvent (preferably water), wherein said $CO_2$ has been dissolved, such as filling in carbonated water. Said pressure may be a pressure in the range of 2 to 6 bar, such as 3 to 5 bar, for example 4 bar. In particular the partial pressure of said $CO_2$. may be in the range of 2 to 6 bar, such as 3 to 5 bar, for example 4 bar. Preferably, the level of $CO_2$ in the second chamber is essentially unchanged, i.e. it has increased with less than 30%, preferably less than 20%. Preferably, the $CO_2$ is measured using an IR sensor electrode. When $CO_2$ permeability is measured using this method the polymer material is said to be essentially impermeable to $CO_2$, when the level of $CO_2$ in the second chamber increases with less than 30%, preferably with less than 20% in 8000 min.

Use of the Polymer Material

The polymer material according to the present invention is useful for a number of different applications. One preferred use of the polymer material is as a container for liquids.

When the polymer material should be used as a container for liquids, the polymer material is preferably prepared using a mould of a suitable shape for such containers.

Suitable shapes for containers for liquid includes for example various bottle shapes, cubic shapes, cylindrical shapes and boxes, preferably, however the container for liquid is a bottle. It is preferred that the bottle it self is prepared entirely of the polymer material of the invention, however, any closure means (such as a lid or a cap, for example a crown cap) may be prepared from another material, for example metal (such as aluminium or iron) and/or plastic.

The liquid may be any liquid. However, in one preferred embodiment of the invention the polymer material is used as a container for beverages, in particular, the polymer material may be used as a container for carbonated beverages, such as carbonated soft drinks or beer. In this embodiment it is of particular importance that the polymer material has the preferred strength described herein above in the section "Properties of the polymer material".

In one embodiment of the invention, the polymer material may be used for preparing food storage materials. Preferably the food storage materials may be selected from the group consisting of rates, cans, boxes, glass substitutes and table utensils. Preferably said glass substitutes are disposable glass substitutes. Thus the invention relates to table utensils comprising or preferably consisting of the polymer material according to the invention. Preferably, said table utensils are disposable table utensils, which due to the biodegradable nature of the polymer material would then preferably also be biodegradable. The table utensils may for example be cutlery, such as spoon, forks or knifes or it may be plates or cups or polymer-glasses.

EXAMPLES

The following examples are provided to illustrate embodiments of the invention and should not be regarded as being limiting for the invention.

Example 1

Acryloylation in Solution

Acryloylation in solution was performed using a procedure similar to the procedure for synthesis of soluble cellulose acetoacetates as described in Edgar K. J., Arnold K. M., Blount W. W., Lawniczak, J. E., Lowman D. W. *Macromolecules* 1995, 28, 4122-4128. Barley straw was ground in a laboratory blender and further powdered three times in a FOSS CYCLOTEC 1093 sample mill. The average particle size of the powder was 36 to 360 to 590 µm. Three times powdered barley straw (5 g) was taken into a 500 ml RB flask fitted with a dropping funnel. Dichloromethan (DCM) dry 30 ml was added followed by addition of triethanolamine (TEA) (13.02 ml 93.75 mmol). The reaction mixture was maintained under argon and cooled in an ice bath. Methacryloyl chloride (9.027 ml, 93.75 mmol) was added drop wise within 30 min. After 1 h of stirring at 0° C., the ice bath was removed and the reaction mixture stirred at (22° C.) over night. After over night reaction, the reaction mixture was cooled in an ice bath and methanol was added dropwise (30 mL) in 15 min. The reaction mixture was filtered and product washed with methanol, water, ethanol and DCM. The product was dried (4.3 g) under high vacuum.

A similar procedure was used for preparing cellulose acrylate/methacrylate except that crystalline cellulose was used instead of the barley powder and acryloyl chloride was used when appropriated.

A similar procedure was used for making cellulose acrylate/methacrylate as well as coconut fibre methacrylate.

Instead of grounded barley stray either crystalline cellulose (Sigma-Aldrich) or coconut fibre was used. The coconut fibre was cut into 3-5 mm bits using scissors prior to methacryloylation reaction. A schematic representation of the reaction is shown in FIG. 1.

Barley Straw Methacryloylation: Microwave Procedure

NaOH Pre-Treatment

Figure 5:
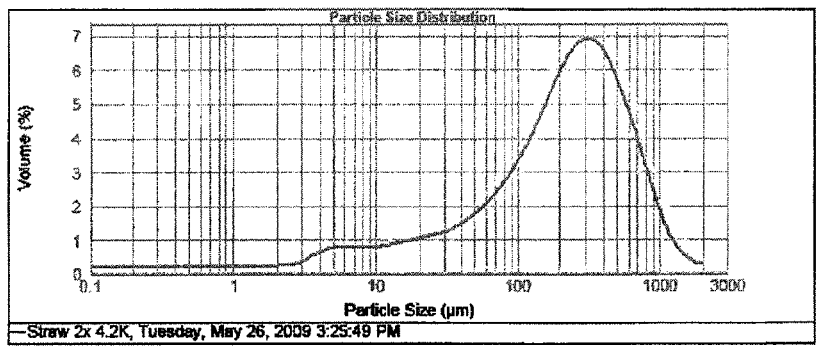
FIG. 5 illustrates the particle size distribution of barley straw after Pulsewave milling.

Barley straw was first cut into small pieces 5 cm long using scissors and milled using a Pulsewave resonance mill. The particle size distribution of the barley straw milled using a Pulsewave resonance mill is shown in FIG. 5. The powder was passed through a 600-mesh sieve which removed all the larger particles. 10 g samples were weighed into Teflon microwave reaction vessel and 100 ml NaOH solution (0.32%) was added.

Three reaction vessels with same amount of reactants along with one water sample for temperature control, was simultaneously heated in a Milestone Microwave equipment under constant magnetic stirring at 80° C. for 20 min. The reaction mixture was allowed to cool and transferred into 50 ml centrifuge tubes and centrifuged. The dark coloured supernatant solution was discarded and the solid product was washed with water (sonicated) 6 times. The product was lyophilized to obtain 22 g (73%) dry powder.

Methacryloylation

The pre-treated barley straw (7.5 g) was weighed into a Teflon microwave reaction vessel and added 100 ml N, N'dimethylacetamide (DMA) containing hydroquinone inhibitor (100 mg). The mixture was stirred and added triethylamine (7.7 ml; 55.3 mmol) followed by drop wise addition of methacryloyl chloride (5.5 ml; 56.3 mmol). The vessel was immediately sealed for microwave heating. Three reaction vessels with same amount of reactants along with a DMA sample for temperature control, was simultaneously heated in a Milestone Microwave equipment under constant magnetic stirring at 95° C. for 20 min. The reaction mixture was cooled to room temperature and filtered. The product was washed with DMA, methanol, ethanol, DCM 3 times each and dried under high vacuum to yield 22 g dry powder.

Similar methacryloylation was performed using either sisal fiber or commercial cellulose powder. In the case of methacryloylation of sisal fiber and commercial cellulose powder triethyl amine was not used.

Example 2

Cellulose-acrylate macro-monomers were prepared as described in Example 1. The micro-fibre character of the cellulose is maintained and only the surface hydroxyl groups are modified by acryloyl/methacryloyl chloride reaction in presence of a base (triethylamine). Acrylic acid was co-polymerized with cellulose-acrylate at 80° C. to obtain the polymers shown in table 1.

TABLE 1

| Polymer | Cellulose | Cellulose Acrylate | Acrylic acid | Ammonium persulphate | Water | TEMED | Dry wt. of sheet | After swelling in water | % Cellulose | % Water intake |
|---|---|---|---|---|---|---|---|---|---|---|
| RMA-1118-75-C | X | 150 mg | 100 µl | 100 µl | 500 µl | 25 µl | 196/147 mg | 160 mg | 60 | 8 |
| RMA-1118-76-B | X | 200 mg | 63 µl | 100 µl | 500 µl | 25 µl | 158 mg | 221 mg | 76 | 40 |
| RMA-1118-78-B | X | 180 mg | 100 µl | 100 µl | 500 µl | 25 µl | 198 mg | 256 mg | 64 | 29 |
| RMA-1118-79-A | 150 mg | X | 100 µl | 100 µl | 500 µl | 25 µl | 200 mg | 272 mg | 60 | 36 |
| RMA-1118-79-B | X | 800 mg | 260 µl | 400 µl | 2 ml | 100 µl | 867 mg | 1,417 g | 75 | 63 |
| RMA-1118-80-C | X | 200 mg | 50 µl | 100 µl | 600 µl | 25 µl | Not stable | | 80 | |
| RMA-1118-80-B | X | 210 mg | 40 µl | 100 µl | 800 µl | 25 µl | No Sheet formed | | 84 | |
| RMA-1118-80-A | X | 230 mg | 26 µl | 100 µl | 800 µl | 20 µl | No Sheet formed | | 90 | |
| RMA-1118-81-B | X | 800 mg | 260 µl | 400 µl | 3 ml | 100 µl | 875 mg | 1.361 g | 75 | 56 |
| RMA-1118-83-A | X | 800 mg | 200 µl | 400 µl | 3 ml | 100 µl | 772 mg | 1.4898 g | 80 | 93 |
| RMA-1118-83-B | X | 800 mg | 150 µl | 400 µl | 3 ml | 100 µl | Cracked | Not stable | 84 | |

A standard solution of Ammonium per sulphate 500 mg/mL water was prepared and 100 or 400 µl (see Table 1) of this solution was added to the polymerisation reaction.

This study shows that a stable polymer sheet may be obtained with up to 80% cellulose-acrylate in copolymerization with acrylic acid. The polymer sheets were thoroughly washed with water and swelled in water for 12 to 24 hr without causing any stability problem. The wt. of the polymer after drying and just swelled in water is shown in the table. The intake of water during swelling varies from 8 to 63% compared with dry weight and depending on the composition of the polymer. Some polymers have an even higher water intake and these polymer are not considered useful as containers for liquids.

Example 3

Metharylate-Barley-Straw Polymers

In order to get more stable polymers with less water uptake ethylmethacrylate and ethyl acrylate were introduced in the polymerization mixture. The plant fibre material, the filler materials, the monomer, the crosslinkers and the radical initiator as well as the amounts used for polymerisation are described in Table 2A below. The components were added to the polymerisation mixture in the indicated order.

TABLE 2A

Details of Synthesis of Polymer 127 and 128

| Order of Addition | | RMA-1118-127 (Coir) | RMA-1118-128 (Banana) |
|---|---|---|---|
| 1 | Cellulose methacrylate | 3.54 g | 2.72 g |
| 2 | Ethylmetharylate | 6.8 ml | 6.8 ml |
| 3 | Barley straw methacrylate | 2.59 g | 1.7 g |
| 4 | Acrylic acid | 13.6 ml | 13.6 ml |
| 5 | Plant Fibre metharylate | 850 mg | 850 mg |
| 6 | Crosslinker; Aldrich 24,684-0 | 3 ml | 3.4 ml |
| 7 | Ethylacrylate | 6 ml | 6.8 ml |
| 8 | TEMED | 2.5 ml | 2.5 ml |

TABLE 2A-continued

Details of Synthesis of Polymer 127 and 128

| Order of Addition | | RMA-1118-127 (Coir) | RMA-1118-128 (Banana) |
|---|---|---|---|
| 9 | Lauroyl peroxide; Aldrich 290785 | 550 mg | 600 mg |
| 10 | AIBN; Aldrich 44,091-4 | 660 mg | 700 mg |
| 11 | Ammonium persulphate | 900 mg | 700 mg |
| 12 | EtOH | 9 ml | 1.5 ml |
| 13 | Water | 8 ml | 2.5 ml |

The composition from which another more stable polymers were prepared is given in Table 2B.

TABLE 2B

| RMA-1118-110A | | Swelling | |
|---|---|---|---|
| Cellulose methacrylate | 160 mg | | |
| Barley straw methacrylate | 100 mg | EtOH | 1.81 g |
| Ethylmetharylate | 400 ul | | |
| Ethylacrylate | 400 ul | Water | 1.86 g |
| Acrylic acid | 800 ul | | |
| Crosslinker Aldrich 24,684-0 | 200 ul | DCM | 1.81 g |
| Coconut fiber metharylate | 50 mg | | |
| TEMED | 200 ul | DMF | 1.83 g |
| Ammonium persulphate | 90 mg | | |
| AIBN Aldrich 44,091-4 | 75 mg | | |
| Lauroyl peroxide Aldrich 290785 | 75 mg | | |
| EtOH | 1 ml | | |
| Water | 1 ml | | |
| Dry yield | 1.46 g | | |

The components were added to the mixture in the order as presented in Table 2B. This polymer is expected to be superior in case of tensile strength. A crosslinking agent is added, i.e. the crosslineker Aldrich 24,684-0 of the following formula:

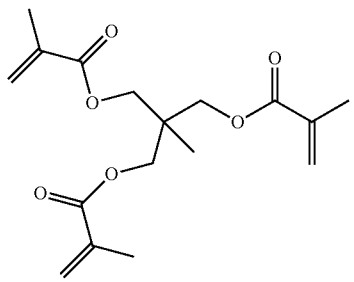 [SMILES: C=C(C)C(=O)OCC(C)(COC(=O)C(=C)C)COC(=O)C(=C)C]

The plant fibre material used in this polymer material is methacrylated coconut fibre prepared as described in Example 1. Two different filler materials are used, namely cellulose methacrylate prepared as described in Example 1 and barley straw methacrylate also prepared as described in Example 1.

Three different monomers were added namely ethylmethacrylate, ethylacrylate and acrylic acid.

To initiate polymerisation, 4 different free radical initiators were added, namely TEMED, ammonium persulphate, lauroyl peroxide and AlBN Aldrich 44,091-4 of the formula

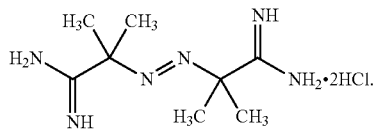

Figure 2:
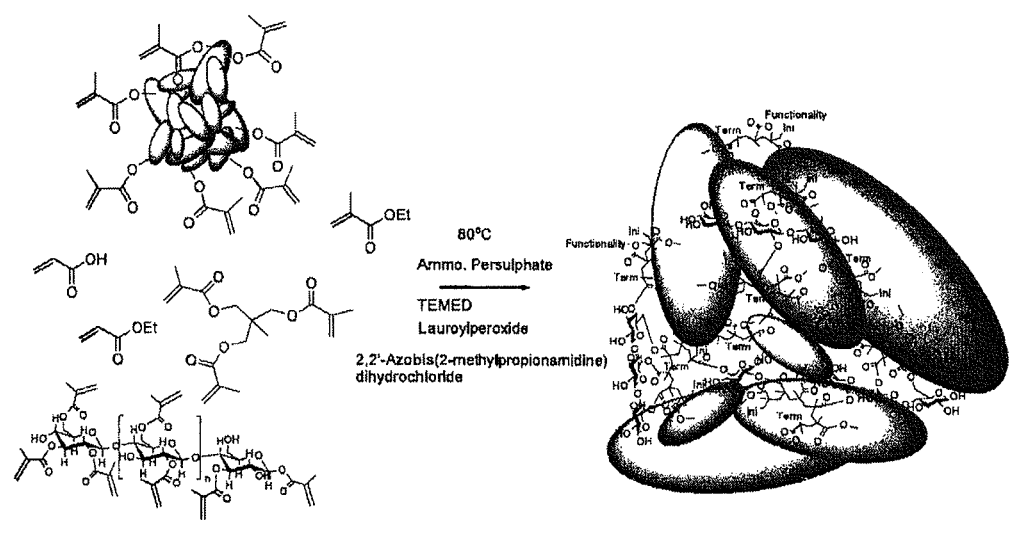
FIG. 2 shows a schematic representation of a polymerisation leading to a polymer material of the invention. In this example the plant fibre is represented by ovals, which are methacryloylated and the filler material is methacryloylated cellulose. 3 different monomers are used, which in this example are ethylmethacrylate, ethylacrylate and acrylic acid. In this example a cross-linker is added, namely the cross-linker Aldrich 24,684-0. As free radical initiators, TEMED, ammonium persulphate, lauroylperoxide and 2,2'-azobis(2-methylpropionamidine)dihydrochloride are used.

A schematic overview of the polymerisation is given in FIG. 2.

The same polymer was cast in a steel polymerization block, fitted with vacuum sealing and provision to introduce inert atmosphere. The inner diameter of the block is 9 cm and thickness of the polymer sheets can be varied; 3 mm 4 mm and 5 mm. The amount and order of addition of the various reagents is given in Table 3.

TABLE 3

Synthesis of 9 cm diameter/3 mm thickness circular polymer sheet

| RMA-1118-121 Order of Addition | | |
|---|---|---|
| 1 | Cellulose methacrylate | 1.6 g |
| 2 | Barley straw methacrylate | 1.0 g |
| 3 | Ethylmetharylate | 4 ml |
| 4 | Acrylic acid | 8 ml |
| 5 | Coconut fiber metharylate | 500 mg |
| 6 | Crosslinker; Aldrich 24,684-0 | 2 ml |
| 7 | Ethylacrylate | 4 ml |
| 8 | TEMED | 1 ml |
| 9 | Lauroyl peroxide; Aldrich 290785 | 401 mg |
| 10 | AIBN; Aldrich 44,091-4 | 500 mg |
| 11 | Ammonium persulphate | 650 mg |
| | EtOH | 7 ml |
| | Water | 5.5 ml |

Dry weight 18.88 μm; Swelled in water 24.88 g

In a typical polymerization experiment the reagents (plant fibre material, filler materials, monomers, crosslinker and free radical initiators) were mixed thoroughly in a porcelain mortar with a pestle. The order of addition of reagents was as presented in table 3. The slurry was transferred into the polymerization block, purged with argon and sealed. The whole apparatus was kept in an oven maintained at 80° C. with occasional purging of $N_2$. The polymerization is carried out for 3 to 6 hr. The vessel was cooled to 20° C. and opened and the polymer sheet was pushed out with a piston from the bottom of the mould. The polymer sheet was washed in ethanol 100 mL and dialysed in 3×2 L of water and was allowed to dry in the air.

The polymer sheets thus prepared may be used in the rheology test described herein below in Example 4.

Example 4

Rheology Test.

Polymer sheets for example prepared as described in Example 3 are cut to disc shape for tests by using a sawing machine. These discs are tested on a parallel plate type rheometer, NRM-2000, from Nippon Rheology Ki-Ki Co. Ltd. Plate radius is R=2×1 cm. Tests are conducted at different angular frequencies that are varied from 0×031 to 37×7 rad/s. All the measurements are taken at 185° C. Strain amplitude is kept constant at 10%. Steady shear rate applied on oscillatory flow of samples is varied in five steps as 0×01, 0×05, 0×1, 0×5 and 1×0 s-1.

Example 5

Vapour Phase Methacryloylation

In stead of using the method described in Example 1, Plant fibre material and filler material may also be prepared by a vapour phase reaction.

Vapour phase methacryloylation was carried out in 1 g scale, however the reaction may also be performed at larger scale. Microcrystalline cellulose was taken in a polypropylene syringe and capped using another fritted syringe. The setup was maintained at 80° C. in a sand bath and passed methacryloyl chloride vapours. Methacryloyl chloride was taken in a 500 ml RB fitted with a bubbler. A slow stream of dry argon was passed though the flask maintained at 60° C. The outlet was passed through a freeze trap cooled in a dry ice acetone mixture. After 6 hr, the reaction was stopped and product transferred to a sintered funnel and washed with methanol, water ethanol and DCM. The product dried under high vacuum. (Yield 1.15 g).

Instead of cellulose, grounded barley stray and/or coconut fibre may be methacrylated using this method.

Example 6

Estimation of Degree of Methacryloylation RMA-1118-69 of the Formula

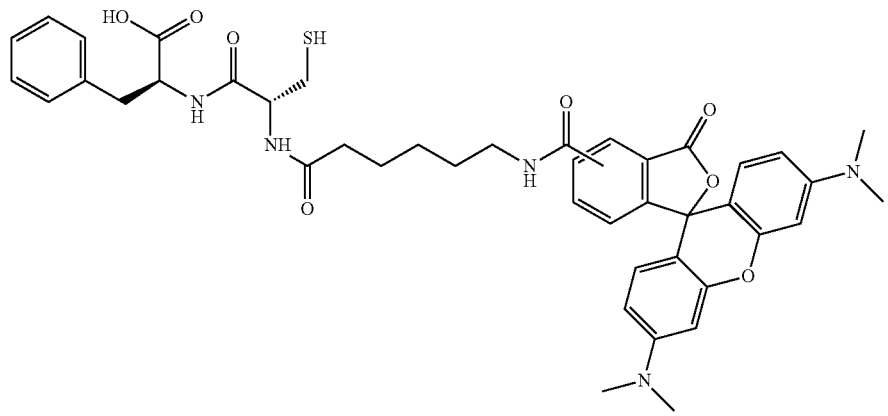

RMA1118-69
$C_{43}H_{47}N_5O_8S$
Exact Mass: 793.3145
Mol. Wt.: 793.9270
m/e: 793.3145 (100.0%), 794.3179
(47.8%), 795.3212 (11.2%), 795.3103
(4.4%), 796.3137 (2.1%), 794.3116
(1.9%), 796.3246 (1.7%), 795.3188 (1.6%)
C, 65.05; H, 5.97; N, 8.82; O, 16.12; S, 4.04 was synthesised by standard solid phase synthesis using PEGA-HMBA resin (100 mg 0.38 mmol/g). (commercially available from NovBiochem, Germany).

The building block 5/6-carboxy tetramethyl rhodamine dye was coupled by TBTU method using 3.5 excess reagents. The resin was treated with TFA (98.5%); water (0.5%); TIPS (0.5%); ethanedithio (0.5%); 1.5 hr. The product resin washed with DCM, DMF, neutralized with 5% DIEA-DMF, and further washed with DMF, DCM and methanol. The resin was dried under vacuum and treated with 0.1 M NaOH, after 2 hr. The resin was filtered and filtrate collected. Two more cleavage procedure (10 min) was repeated to make sure the entire product came out of the resin. The combined filtrate neutralized with 1 M HCl and evaporated to dryness. Analytical HPLC show two major peaks at 4.45 min and 4.65 min. LCMS show identical mass 794.3 (M+H) (Cal 793. 324 M+H) This product was used as dye with out further purification.

The free thiol group in the dye will react with the double bonds on the surface modified coconut fibre, grounded barley straw or cellulose. This will give increased fluorescence compared to unmodified fibre/cellulose. It is possible to measure the fluorescence intensity under a fluorescence microscope and get relative fluorescence values from the pictures taken using computer programme.

Figure 3:
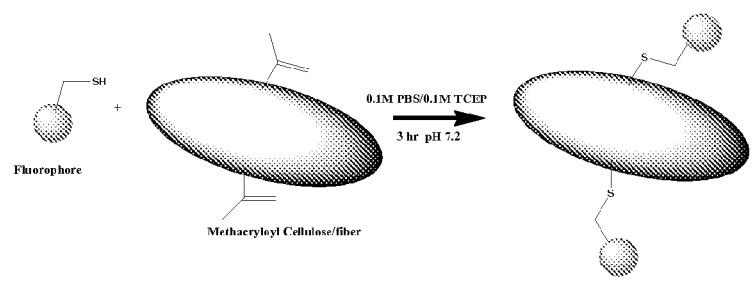
FIG. 3A shows a schematic representation of a reaction between a fluorophore comprising a thiol group and methacryloyl cellulose/plant fibre/filler, wherein the cellulose/plant fibre/filler is depicted as an oval. The reaction leads to a covalent bound between the cellulose/plant fibre/filler and the fluorophore.
FIG. 3B shows an example of a picture of barley straw reacted with RMA-1118-69 (left) and a picture of methacryolated barley straw reacted with RMA-1118-69. Barley Straw before methacryloylation had an Intensity of 193, whereas Barley Straw after methacryloylation had an Intensity of 364.
Figure 3:
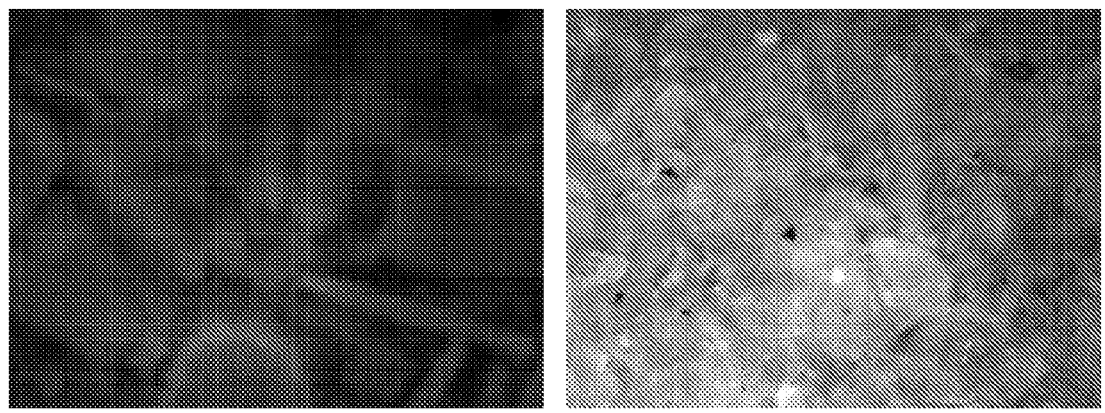
Figure 4:
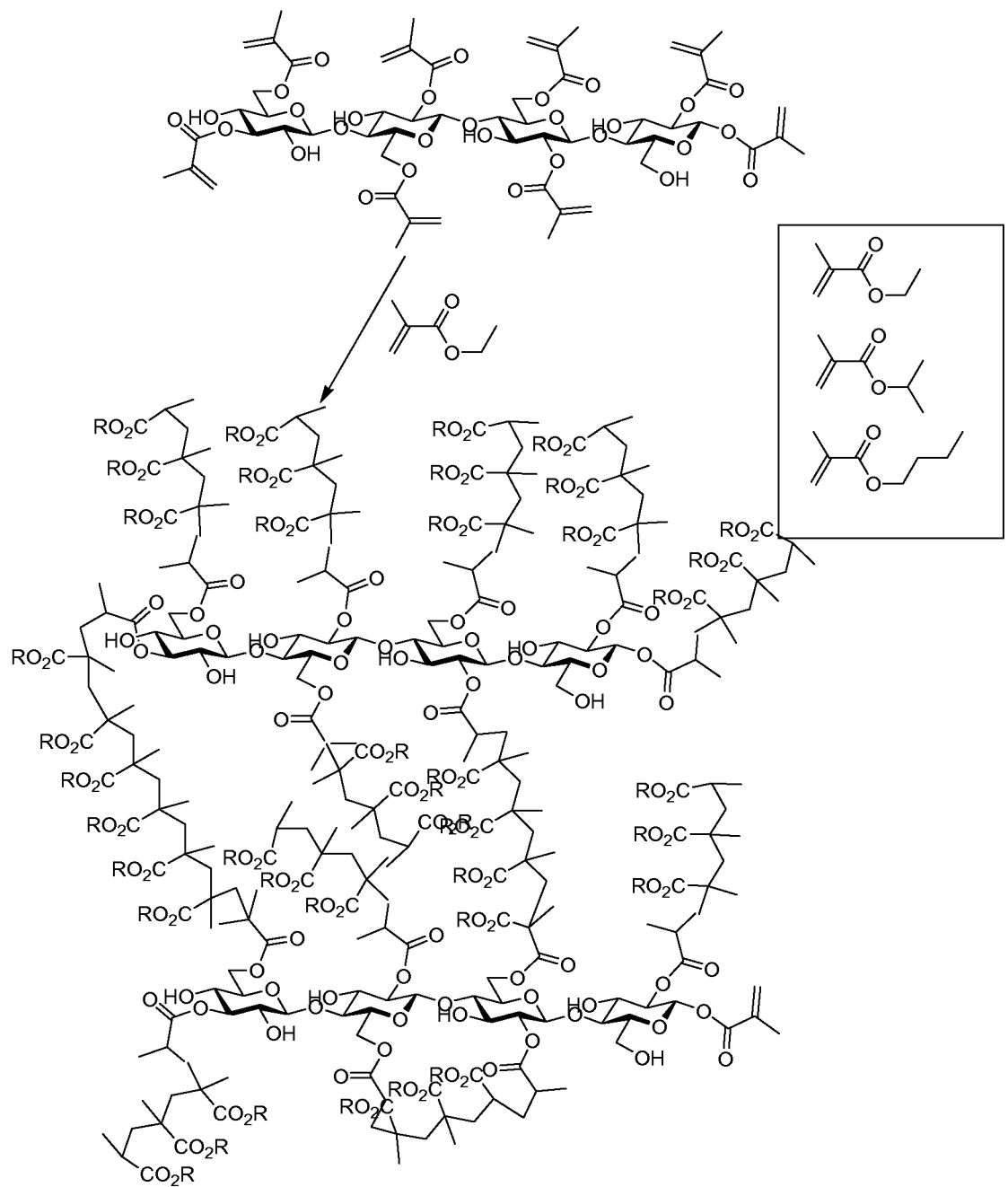
FIG. 4 shows a schematic representation of a polymerisation leading to a polymer material according to the invention. The schematic representation only shows the reaction between methacryloylated cellulose and monomer, however, said methacryloylated cellulose could be comprised in a methacryloylated plant fibre or a methacryloylated filler. Only one monomer (ethyl methacrylate) is shown, however other monomers may be employed or a mixture of monomers, such as the monomers shown in the box. In this example no cross-linker is added.

A schematic overview of the reaction is given in FIG. 3A.

In a typical experiment, methacryloylated barley straw/cellulose samples and blanc samples (i.e. barley straw/cellulose, which has not been methacryloylated) were weighed (25 mg) separately in a 5 ml syringe fitted with Teflon frit. The samples washed with reaction buffer. 0.1 M PBS buffer containing 0.1 M, TCEP (2 times). PBS buffer (500 ul) was added to the sample followed by addition of dye stock solution (1 µg RMA-1118-69/µl) in DMF (25 µl). The reaction mixture was shaken thoroughly and kept at room temp with occasional shaking for 3 hr. The samples was washed with water and DMF, kept in DMF over night and further washed with water left in water over night and final water wash. The samples was transferred to an 8 well titre-plate (1 ml water) and viewed under microscope (ZESS inverted microscope AXiOVERT 200M)

Pictures were taken under identical conditions and analyzed using computer software MetaMorph Meta Imaging series environment. (Molecular Devices). An example of a picture of barley straw before methacryloylation and barley straw after methacryloylation is shown in FIG. 3B. Barley Straw before Methacryloylation had an Intensity of 193, whereas Barley Straw after Methacryloylation had an Intensity of 364.

In general if the sample average intensity value is approximately 2 times that of blanc, the methacryloylation reaction has taken place to desired extend.

Barley Straw methacryloylated using the microwave procedure as described in Example 1 in general gave up to 2.4 to 4.5 times the fluorescence compared to barley straw, that was not methacryloylated Abbreviations:

PEGA=polyethyleneglycol poly acrylamide resin

HMBA=hydroxy methyl benzoic acid

TBTU=O(1H-Benzotrizol-1-yl)1,1,3,3-tetramethyl-uronium tetrafluoroborate, CAS no. 125700-67-6

DIEA=Di-isopropyl ethylamine.

DCM=Dichloromethane

DMF=NN' dimethylforamide.

TIPS=Triisopropylsilane

LCMS=liquid chromatography, mass spectrometry

HPLC=high-pressure liquid chromatography.

TFA=trifluoroacetic acid

Example 7

Biodegradability Study

The tests are performed to determine whether biodegradation of polymeric materials and other organic components in the plastic product can occur and optionally also to improve the understanding of the degradation mechanism.

The test methods are standard methods for assessing the compostability of environmentally degradable plastics and are further described in Standard Guide for Assessing the Compostability of Environmentally Degradable Plastics; American Society for Testing and Materials (ASTM) D 6002-96 (Reapproved 2002).

The test method numbers also refer to above mentioned standard.

In addition, reference is made to "Test methods and standards for biodegradable plastics: K. J. Seal In chemistry and technology of biodegradable polymers: Ed. G. J. L. Griffin. Pub. Blackie Academic & Professional, UK @ 1995".

Biodegradation is based on carbon dioxide production. The following test methods may be used to determine biodegradability of polymer materials, monomeric subunits of the polymer, and other organic components:

Example 7a

Test Method D 5209 (Sturm Test) This aqueous test method uses a fresh sample of activated sewage sludge that has been aerated, homogenized, and settled. The supernatant is used as the inoculum. It contains primarily a mixed bacterial population that promotes rapid biodegradation under mesophilic conditions. The metabolism of test materials produces $CO_2$, which is trapped in alkali solution and quantified by titration. The test length is 30 days if nothing else is indicated. It is however possible to perform the test with an extended test length if the medium is reinoculated. A positive result (recovery of at least 60% of theoretical $CO_2$ after 30 days) indicates that the material will also be biodegrade in a composting environment.

A negative result is confirmed by a laboratory thermophilic composting test such as Test Method D 5338. The contribution of nonmicrobial degradation are quantified by including sterile or poison controls and comparing changes in molecular weight or mass.

Example 7b

Soil Contact Test (Test Method D 5988)—

This static test uses a defined sand/soil/mature compost matrix to provide a consortium of mesophilic and thermophilic bacteria and fungi. Biodegradation is measured in a manner similar to the Sturm test, based on the amount of material carbon converted to gaseous carbon ($CO_2$). Readily biodegradable materials can be screened in 30 to 60 days. Recovery of 60%+ of theoretical $CO_2$ after 60 days is considered a positive result. A negative result should be confirmed under thermophilic composting conditions (Test Method D 5338).

Example 7c

The following test method is used for establishing the biodegradation rate of a polymeric material in a composting environment.

Test Method D 5338 is for establishing the biodegradability of a polymer material in a composting environment. Material biodegradability is based on the amount of material carbon recovered as gaseous carbon ($CO_2$) relative to the amount of material carbon originally added to the compost. Biodegradation rates or end points should be compared to the reference materials described in below.

If a negative result is obtained, the controls described are tested in the test method or the test method is repeated with a lower dose closer to field-use levels.

Products or polymer materials may be compared under identical conditions to natural reference materials known to be biodegradable in a composting environment for example, cellulose or starch. Other materials considered as biodegradable within this context are oak, maple, and corn leaves and craft paper. Unmodified polyethylene film, typically used to collect yard trimmings, is in this context considered a negative reference material.

The recovery of all material carbon as gaseous carbon ($CO_2$) may be impractical due to the incorporation of material carbon into microbial biomass or stable humic substances. Thus, recovered $CO_2$ should be compared to recovered $CO_2$ of the positive and negative controls. A recovery rate of $CO_2$ (i.e. % $CO_2$ recovered of total possible) of at least 50%, preferably at least 60%, more preferably at least 70%, yet more preferably at least 80% of the recovery rate of $CO_2$ of the positive control is considered a positive result and such materials are considered biodegradable according to the invention.

The test duration is 45 days if nothing else is indicated, but it may be extended to simulate field conditions.

Example 7d

Soil Burial Tests

The polymer material to be tested is buried in soil beds prepared in the laboratory using standard sieved soil. The soil beds are normally conditioned up to 4 weeks prior to use and may be supplemented with organic fertiliser to encourage an active microbial flora. The soil beds containing the samples are incubated at a constant temperature for between 28 days and 15 months. The moisture content is set at 30-40%. Samples are removed for assessment of changes in their properties such as weight loss, mechanical strength changes or microscopic examination to assess surface damage and to look for the presence and nature of microbial growth.

Example 8

Dynamical Mechanical Analysis and Tensile Strength Measurement

A set of polymers sheets were prepared for testing the tensile strength properties of the polymer material.

The plant fibre material, the filler materials, the monomer, the cross-linkers and the radical initiator as well as the amounts used for polymerisation are described in Table 4 below. The components were added to the polymerisation mixture in the indicated order. The mixture was transferred to a mould of circular shape to prepare the disc shaped polymers.

1 to 3.5 mm thick polymer sheets circular shape were prepared and cut into strips of 10 mm width and 60 mm length. These samples are used for DMA (dynamic mechanical analysis) as well as tensile strength measurement using a Hounsfield Test Equipment W-series H20K-W.

Sample Preparation for Tensile Strength Measurement.

Circular polymer sheet 9 cm diameter were cut into strips 10 mm breadth. 5 pieces were obtained from each circular sheet. The free end of each strip was covered with a Scotch tape (3M) leaving 30 mm in the middle portion. The covered ends were clipped onto the test equipment. The samples were moisturized with a few drops of water-ethanol (25%) mixture and kept in a sealed plastic envelope before the testing was carried out.

The samples were run at a speed of 90 mm/minute and out-put plotted in a graphical format. Modules (G) calculated by standard method essentially as described in "Materials Science and Engineering; an Introduction, by William D. Callister, Jr. Pub. Wiley 7$^{th}$ Ed. 2007".

TABLE 4

Preparation of polymer sheets (1 mm thickness, 90 mm diameter)

|  | 158<br>1 mm<br>9 cm<br>Coir | 162*<br>1 mm<br>9 cm<br>Sisal | 163<br>1 mm<br>9 cm<br>Sisal | 164<br>1 mm<br>9 cm<br>Banana | 165<br>1 mm<br>9 cm<br>Manil | 166<br>1 mm<br>9 cm<br>Hemp |
|---|---|---|---|---|---|---|
| Cellulose methacrylate | 1.5 g | 1.5 g | 1.5 g | 1.5 g | 1.5 g | 1.5 g |
| Ethylmetharylate | 2.5 ml | 3 ml | 2.5 ml | 2.5 ml | 2.5 ml | 2.5 ml |
| Barley straw methacrylate | 1.4 g | 1.4 g | 1.4 g | 1.4 g | 1.4 g | 1.4 g |
| LaurylMethacrylate | 3.0 ml | 3.0 ml | 3.0 ml | 3.0 ml | 3.0 ml | 3.0 ml |
| Acrylic acid | 3.5. ml | 7 ml | 3.5. ml | 3.5. ml | 3.5. ml | 3.5. ml |
| Crosslinker Aldrich 24,684-0 | 1.2 ml | 2 ml | 1.2 ml | 1.2 ml | 1.2 ml | 1.2 ml |
| fiber metharylate | 600 mg | 600 mg | 600 mg | 600 mg | 600 mg | 600 mg |
| Ammonium persulphate | 130 mg | 130 mg | 130 mg | 130 mg | 130 mg | 130 mg |
| AIBN Aldrich 44,091-4 | 100 mg | 100 mg | 100 mg | 100 mg | 100 mg | 100 mg |
| EtOH | 4 ml | 3.5 ml | 3 ml | 3.5 ml | 3.5 ml | 3.5 ml |
| Water | 3.5 ml | 3.5 ml | 3.5 ml | 3.5 ml | 3.5 ml | 3.5 ml |
| Yield | 5.6 g | 7.5 g | 6.8 g | 5.9 g | 6.3 g | 6.9 g |
| Water Swelling % | 13 | 19 | 24 | 26 | 26 | 27 |

*In the case of 162 the barley straw was treated with 5% NaOH 4 hr prior to the methacryloylation reaction From the above study (Table 4) it was found that barley straw after treatment with NaOH (5%) 4 hr prior to methacryloylation gave better polymers materials. Hence new sets of polymers were prepared to evaluate this. This shows that NaOH treated barley straw gave better polymer materials. Additionally, polymer materials prepared using sisal fibre material are superior to some of the other polymer materials.

New polymer materials were therefore prepared, wherein barley straw was treated with 5% NaOH 4 hr. prior to methacryloylation. The plant fibre material, the filler materials, the monomer, the crosslinkers and the radical initiator as well as the amounts used for polymerisation are described in Table 5 below. The components were added to the polymerisation mixture in the indicated order. The mixture was transferred to a mould of circular shape to prepare the disc shaped polymers (1 mm thick, 9 cm in diameter).

The sisal polymer material designated RMA-1118-177 contains 45.5% biomaterial. The results of the tests are also shown in Table 5.

TABLE 5

Polymer prepared to study the effect of NaOH treated barley straw

|  | RMA-1118- | | | | |
|---|---|---|---|---|---|
|  | 175<br>1 mm 9 cm<br>Coir | 176<br>1 mm 9 cm<br>Banana | 177<br>1 mm 9 cm<br>Sisal | 178<br>1 mm 9 cm<br>— | 180<br>1 mm 9 cm<br>Hemp |
| Cellulose methacrylate | 1.5 g | 1.5 g | 1.5 g | 1.8 g | 1.5 g |
| Ethylmetharylate | 3 ml | 3 ml | 3 ml | 3 ml | 3 ml |
| Barley straw methacrylate | 1.4 g | 1.4 g | 1.4 g | 1.7 g | 1.4 g |
| LaurylMethacrylate | 3.0 ml | 3 ml | 3.0 ml | 3.0 ml | 3.0 ml |
| Acrylic acid | 7 ml | 7 ml | 7 ml | 7 ml | 7 ml |
| Crosslinker Aldrich 24,684-0 | 2 ml | 2 ml | 2 ml | 2 ml | 2 ml |
| Fiber metharylate | 600 mg | 600 mg | 600 mg | — | 600 mg |
| Ammonium persulphate | 130 mg | 130 mg | 130 mg | 130 mg | 130 mg |
| AIBN Aldrich 44,091-4 | 100 mg | 100 mg | 100 mg | 100 mg | 100 mg |
| EtOH | 2 ml | 3.5 ml | 3.5 ml | 2 ml | 3.5 ml |
| Water | 2 ml | 3.5 ml | 3.5 ml | 2 ml | 3.5 ml |
| Yield | 7.84 g | 7.53 g | 7.69 g | 8.97 g |  |
| Biomaterial % | 45 | 46 | 45.5 | 39.4 |  |
| Water Swelling % | 21 | 25 | 25 | 22 |  |
| Modules (G) MPa | 82 | 88 | 91 | 73 | 70 |

Dynamic Mechanical Analyzes

Dynamic mechanical analyzes were performed. For more details see *Materials Science and engineering an Introduction* by William D. Callister, Jr., Pub. Wiley 7$^{th}$ Ed. 2007.

The samples were measured using the Dynamic Mechanical Analyzer (DMA) NETZSCH-DMA 242 C. With DMA mechanical properties such as storage modulus E', loss modulus E" and loss factor tan δ (ratio of E" to E', damping) are quantitatively determined as a function of temperature, time and frequency of an oscillating sample load. DMA supplies data on temperature application limits, rigidity and damping, flow and relaxation behaviour, the composition and structure of polymers, ageing, vulcanization and curing of materials. The DMA measurements were carried out in 3-point-bending mode with a free bending length of 20 mm. The applied parameters are listed in table 6.

TABLE 6

| Measurement parameters for the samples | |
| --- | --- |
| Parameters | |
| Sample holder | 3-point-bending (free bending length of 20 mm) |
| Temperature range | −50° C. to 90° C. |
| Heating rate | 3 K/min |
| Atmosphere | air |
| Proportional force factor | 1.1 |
| Max. dynamic force | 6.7N |
| Const. part of static force | 0N |
| Max. deformation amplitude | ±80 μm |
| Frequency | 1 Hz |
| Sample length | >20 mm |
| Sample width | 10.22 mm; 9.98 mm; 10.31 mm |
| Sample thickness | 3.92 mm; 3.30 mm; 1.20 mm |

The storage Modulus E' was determined (see Table 7). The polymers used in the study included RMA 1118-127 and RMA 1118-128 prepared as described in Example 3 herein above and polymer 162 prepared as described herein above in this example.

TABLE 7

| Polymer sample | Fiber | Length | Width | Thickness | Storage Modulus E' |
| --- | --- | --- | --- | --- | --- |
| RMA_1118_127 | Coir | 60 mm | 10 mm | 3.1 mm | 3300 Mpa @ −33° C. |
| RMA_1118_128 | Banana | 60 mm | 10 mm | 3.5 mm | 3200 (2400) Mpa @ −32° C. |
| RMA_1118_162 | Sisal | 60 mm | 10 mm | 0.94 mm | 3400 (3200) Mpa @ −37° C. |

Example 9

Ethyl Methacryloylation

Below a reaction scheme for a preferred method of ethylmethacryloylation according to the present invention.

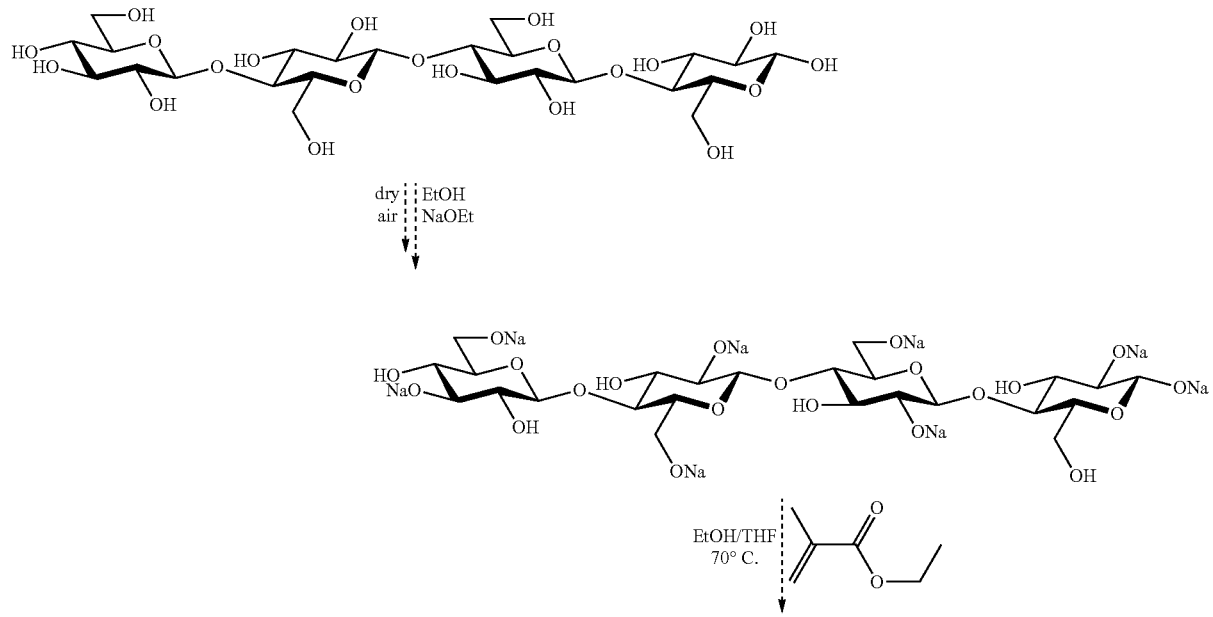

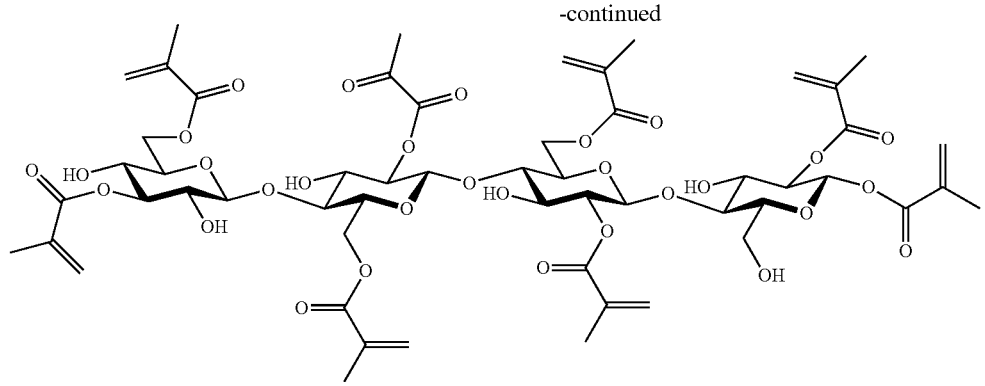

The method is useful for preparing either filler material or plant fibre material. For preparation of filler material a filler, for example purified cellulose or plant material is provided. For preparation of plant fibre material a plant fibre is provided.

Cellulose/plant material/plant fibre is first dried under a stream of dry air and then treated with NaOEt and absolute ethanol as solvent at 70° C. The reaction mixture is filtered and dried. The dry powder re-suspended in absolute ethanol and five fold excess ethyl methacrylate added. The reaction mixture kept at 70° C. overnight and filtered washed with EtOH and dried. The product is characterized by fluorescence dye assay.

Example 10

This example shows a preferred polymer according to the invention. The polymer was polymerised from the constituents shown in table 8. The constituents are mentioned in the order of addition.

TABLE 8

| RMA-1118-190 Order of Addition | Thin_Sheet_1 mm Monomers/initators | 9 cm Dia Amount |
|---|---|---|
| 1 | Ethylmethacrylate | 7 ml |
| 2 | PEG_Methacrylate | 3 ml |
| 3 | Acrylic acid | 3 ml |
| 4 | Crosslinker; Aldrich 24,684-0 | 2 ml |
| 5 | AIBN | 100 mg |
| 6 | Ammonium persulphate soln. | 130 mg |
| 7 | Water | 1 ml |
| 8 | Sisal_methacrylate (1-2 mm) | 4.2 g |

Example 11

Sample Preparation:
NaOH Pre-Treatment

Barley straw was first cut into small pieces 5 cm long using scissors and milled using a Pulsewave resonance mill (Pulsewave, from Pulsewave llc, United States) which resulted in a 100 to 250 □m particle size for the majority of the particles. The size distribution of the particles after Pulsewave milling is shown in FIG. 5.

The powder was passed through a 600-mesh sieve which removed all the larger particles. 10 g samples were weighed into Teflon microwave reaction vessel and 100 ml NaOH solution (0.32%) was added. Three reaction vessels with same amount of reactants along with one water sample for temperature control, was simultaneously heated in a Milestone Microwave equipment under constant magnetic stirring at 80° C. for 20 min. The reaction mixture was allowed to cool and transferred into 50 ml centrifuge tubes and centrifuged. The dark coloured supernatant solution was discarded and the solid product was washed with water (sonicated) 6 times. The product was lyophilized to obtain 22 g (73%) dry powder.

Methacryloylation

The pre-treated barley straw (7.5 g) was weighed into a Teflon microwave reaction vessel and added 100 ml N, N'dimethylacetamide (DMA) containing hydroquinone inhibitor (100 mg). The mixture was stirred and added triethylamine (7.7 ml; 55.3 mmol) followed by drop wise addition of methacryloyl chloride (5.5 ml; 56.3 mmol). The vessel was immediately sealed for microwave heating. Three reaction vessels with same amount of reactants along with a DMA sample for temperature control, was simultaneously heated in a Milestone Microwave equipment under constant magnetic stirring at 95° C. for 20 min. The reaction mixture was cooled to room temperature and filtered. The product was washed with DMA, methanol, ethanol, DCM 3 times each and dried under high vacuum to yield 22 g dry powder.

In the case of methacryloylation of sisal fiber, said sisal fiber was cut in 5 mm pieces using scissors before pre-treatment with NaOH and methacryloylation. For methacryloylation of sisal fiber and commercial cellulose powder triethyl amine was not used.

The monomers indicated in Table 9 were mixed and along with polymerization initiators under $N_2$ atmosphere they were thoroughly mixed with barley straw methacrylate/sisal fibre methacrylate and loaded on to a mould. The mould was closed and pressure applied from 0 to 6 ton gradually. Excess monomers were removed and temperature was slowly raised to 104° C. in 45 minutes. The polymerization mould was maintained at 104° C. pressures 6 ton for 2 hours. The set up was left over night at room temperature. The samples were removed and washed with ethanol and water and ethanol and dried in an air oven at 70° C. for 6 hr. Sample dimension 200 mm×10 mm×4 mm

TABLE 9

| | | RMA-1258- | |
|---|---|---|---|
| Order of Addition | | 100: Barley Straw | 106: Barely Straw Sisal (3:1) |
| 1 | Ethylmethacrylate | 7 ml | 7 ml |
| 2 | N,N' Dimethylacrylamide | 4 ml | 4 ml |
| 3 | Laurylmethacrylate | 5 ml | 5 ml |
| 4 | Crosslinker; Aldrich 24,684-0 | 7 ml | 7 ml |

TABLE 9-continued

| | RMA-1258- | |
|---|---|---|
| Order of Addition | 100: Barley Straw | 106: Barely Straw Sisal (3:1) |
| 5 Acrylonitrile | 13 ml | 13 ml |
| 5 AIBN; Aldrich 44,091-4 | 200 mg | 200 mg |
| 6 Ammonium persulphate | 150 mg | 150 mg |
| 7 Sisal_ methacrylate | — | 1.9 g |
| 8 Barley straw methacrylate | 7.5 g | 5.6 g |
| Yield | 9.79 g | 10.5 g |

Dynamic Mechanical Analysis:

The samples were measured using the Dynamic Mechanical Analyzer (DMA) NETZSCH-DMA 242 C. DMA mechanical properties such as storage modulus E', loss modulus E" and loss factor tan δ (ratio of E" to E', damping) are quantitatively determined as a function of temperature, time and frequency of an oscillating sample load. DMA supplies data on temperature application limits, rigidity and damping, flow and relaxation behaviour, the composition and structure of polymers, ageing, vulcanization and curing of materials. The DMA measurements were carried out in 3-point-bending mode with a free bending length of 50 mm. The applied parameters are listed in table 10.

TABLE 10

| Measurement parameters | |
|---|---|
| Parameters | |
| Sample holder | 3-point-bending (free bending length of 50 mm) |
| Temperature range | −50° C. to 90° C. |
| Heating rate | 2 K/min |
| Atmosphere | Air |
| Proportional force factor | 1.1 |
| Max. dynamic force | 7.2N |
| Const. part of static force | 0N |
| Max. deformation amplitude | ±40 µm |
| Frequency | 1 Hz |
| Sample length | >50 mm |
| Sample width | about 10 mm |
| Sample thickness | About 4 mm |

Figure 6:
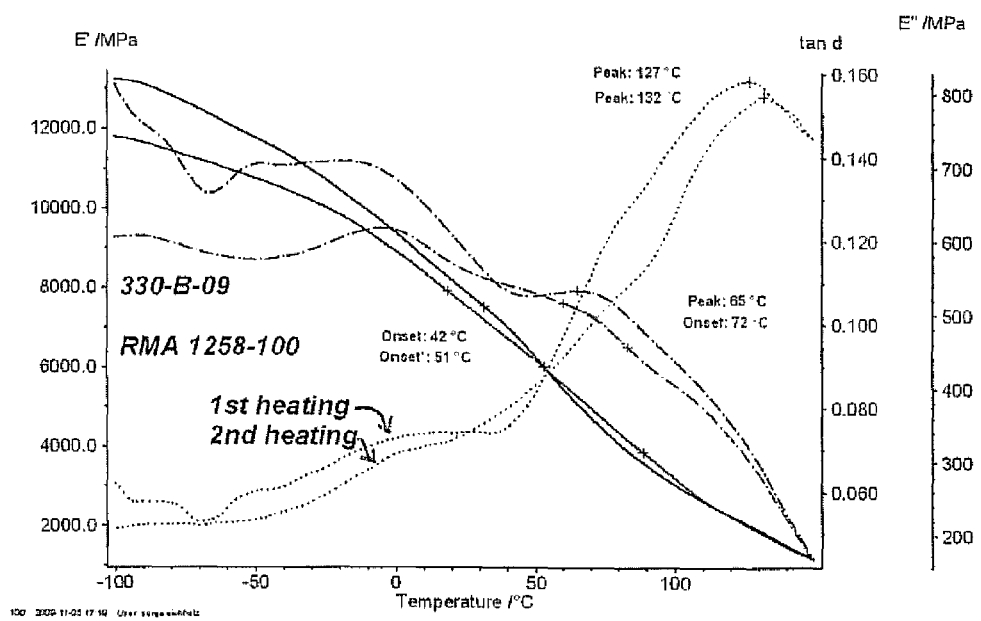
FIG. 6 illustrates a Dynamic Mechanical Analysis (DMA) of Barley Straw based polymer material RMA-1258-100. DMA show that the barley straw containing polymer has relatively high flexural modulus (E') up till 40 to 50° C. and then decreases. The peak tan δ value at 127-132° C. indicate that material becomes soft and looses its strength at higher temperature.
Figure 7:
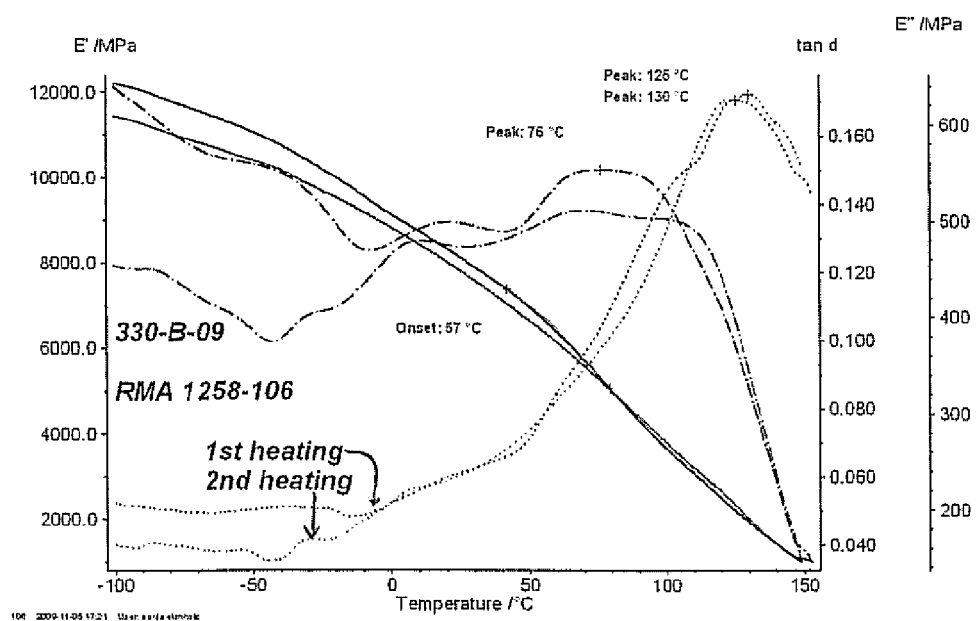
FIG. 7 illustrates a Dynamic Mechanical Analysis (DMA) of Barley Straw: Sisal based polymer RMA-1258-106. DMA show that the sisal containing polymer has relatively high flexural modulus (E') up till 57° C. and then decreases. The peak tan δ value at 125-130° C. indicate that material become soft and looses it strength at higher temperature.

The results are shown in FIGS. 6 and 7 as well as in Table 11.

TABLE 11

| Dynamic Mechanical Analysis data: | | | | | |
|---|---|---|---|---|---|
| Polymer Sample | Fiber | Temp. | E' | E" | tan δ |
| RMA_1258_100 | BarleyStr. | −50° C. | 11769 MPa | 704 MPa | 0.060 |
| RMA_1258_100 | BarleyStr. | 25° C. | 7912 MPa | 587 MPa | 0.074 |
| RMA_1118_106 | BStr: Sisal | −50° C. | 11067 MPa | 560 MPa | 0.051 |
| RMA_1118_106 | BStr: Sisal | 25° C. | 8126 MPa | 499 MPa | 0.061 |

The DMA results show that high-pressure compression moulded samples has enhanced storage modulus compared to low pressure-moulded samples. Higher methacryloylaton of the fibre samples under microwave irradiation plus resonance disintegration milled barley straw plays a role in increasing the strength of the polymer material. Further more sisal containing polymer is showing a relatively ordered state during heating as indicated by lower tan δ value 0.062.

Example 12

Tensile Strength Measurement:

Special moulds were constructed for making dumb-bell shaped test specimen according to ASTM D 638-89 type III. Length 246 mm; width 19 mm; thickness 2.2-2.7 mm. Polymerization was carried out as mentioned above in Example 11 with the ingredients of Table 12.

Tensile strength was measure at Intertek Polychemlab BV according to standard ISO527 1 A specifications. The experiments for tensile test were run with a speed of 10 mm/min and 2 mm/min for E-Modulus.

TABLE 12

| | RMA-1258- | |
|---|---|---|
| Order of Addition | 99 Barley Straw | 106: Barely Straw Sisal (3:1) |
| 1 Ethylmethacrylate | 11 ml | 11 ml |
| 2 N,N' Dimethylacrylamide | 6 ml | 6 ml |
| 3 Laurylmethacrylate | 5 ml | 5 ml |
| 4 Crosslinker; Aldrich 24,684-0 | 11 ml | 11 ml |
| 5 Acrylonitrile | 21 ml | 21 ml |
| 5 Azo initiator; Aldrich 44,091-4 | 250 mg | 250 mg |
| 6 Ammonium persulphate | 200 mg | 200 mg |
| 7 Sisal_ methacrylate | — | 3.0 g |
| 8 Barley straw methacrylate | 12 g | 3.0 g |
| Yield | 17.05 g | 16.33 g |

The results are shown in Table 13.

TABLE 13

| Tensile Strength measurements of Sisal/Barely straw based polymers | | | | |
|---|---|---|---|---|
| Nr | E-Modulus MPa | Stress at break MPa | Tensile strength N/mm$^2$ | Test Temp |
| B. straw- | 6745.2 | 31.7 | 31.68 | 23° C. |
| Sisal/B-straw | 6288.5 | 29.6 | 29.65 | 23° C. |

This experiments show that both the polymers have relatively similar tensile strength properties.

Example 13

Carbondioxide Permibility Studies

A special apparatus was designed and fabricated in brass and aluminum to study the $CO_2$ permeability of the polymer composites. It consists of an upper chamber to hold water and lower chamber to house a $CO_2$ gas sensor. The outlet was connected to a trap containing 5% NaOH. A polymer was prepared essentially as described in Example 11 using the ingredients described in Table 14.

TABLE 14

| RMA-1258-87 Sl. no. | Disc_2.2 mm thick 5 cm diameter | Amount |
|---|---|---|
| 1 | Ethylmethacrylate | 3.6 ml |
| 2 | N,N'DMA | 2.0 ml |
| 3 | Laurylmethacrylate | 1.7 ml |
| 4 | Crosslinker; Aldrich 24,684-0 | 3.6 ml |

TABLE 14-continued

| RMA-1258-87 Sl. no. | Disc_2.2 mm thick 5 cm diameter | Amount |
|---|---|---|
| 5 | AIBN | 75 mg |
| 6 | Ammonium persulphate/water | 50 mg |
| 7 | Barley Straw_methacrylate | 4.0 g |
| 8 | Acrylonitrile | 7 ml |
|   | Biomaterial | 78% |

The polymer was prepared in circular form 50 mm diameter and 2.2 mm thick by same compression polymerization technique as described in Example 11 and inserted into the upper chamber fitted with a brass sieve. The chamber was closed air tight using an O-ring (Viton$_{FPM}$) and water-containing $CO_2$ was introduced into the chamber. The chamber was connected to $CO_2$ cylinder at 4-bar pressure and the pressure was maintained through out the experiment. $CO_2$ permeation through the polymer disc was monitored by an IR gas sensor CO2-BTA Vernier. Logger Lite software was used for data collection every minute. The whole experiment was carried out for 8000 min.

A metal disc was used as a negative control. PET sheet (0.3 mm thick) was cut into circular form and compression moulded composite polymer (RMA-1258-87) was used for the permeability experiments. A sieved metal disc was used as positive control.

Figure 8:
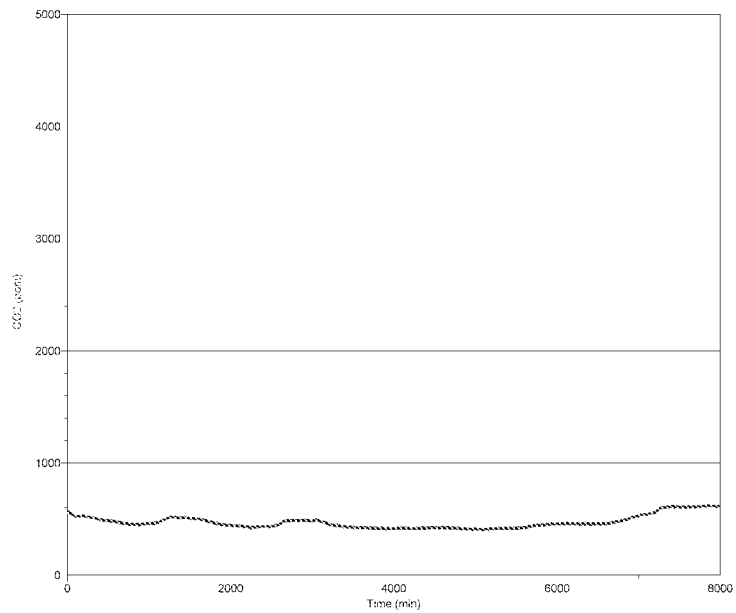
FIG. 8 illustrates the permeability of $CO_2$ through a polymer sheet. Carbonated water is held in a chamber and kept under 4 bar $CO_2$ pressure. The amount of $CO_2$ gas diffusing through A) a polymer disc of polymer RMA-1258-87 B) a PET sheet (standard polymer material), C) a metal sheet (negative control) or D) a sintered metal sheet without any barrier (positive control) is monitored by an IR electrode.
Figure 8:
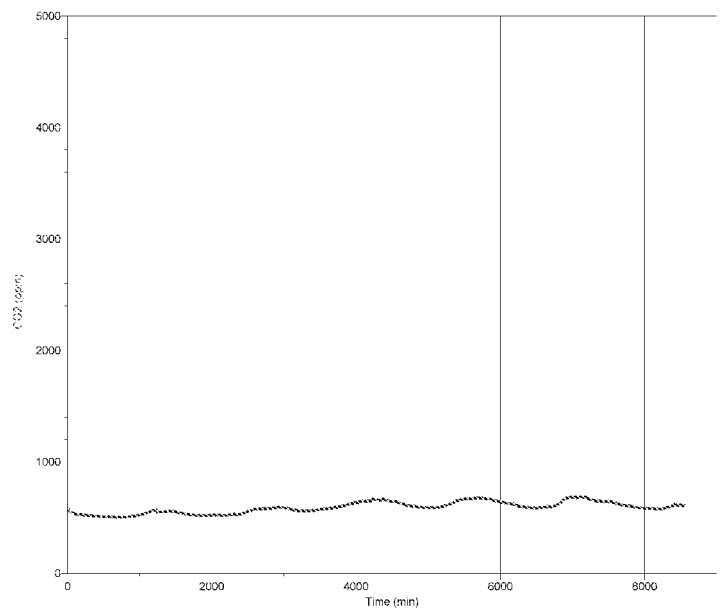
Figure 8:
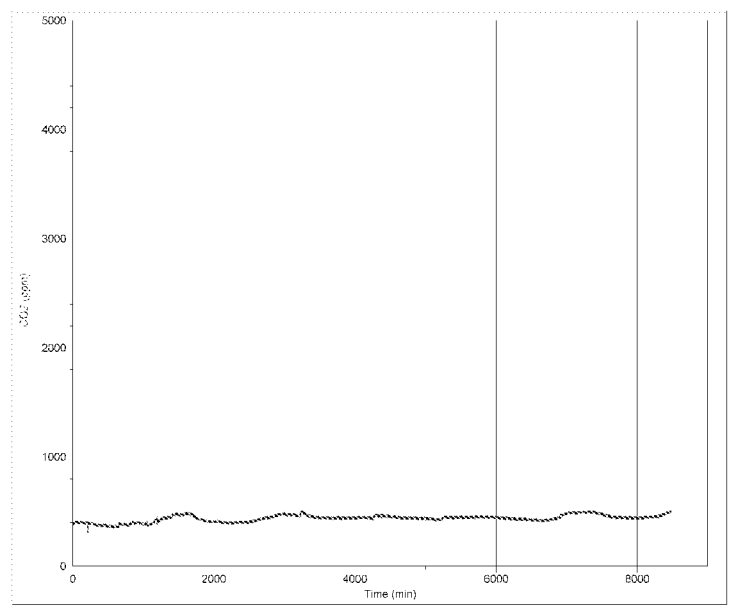
Figure 8:
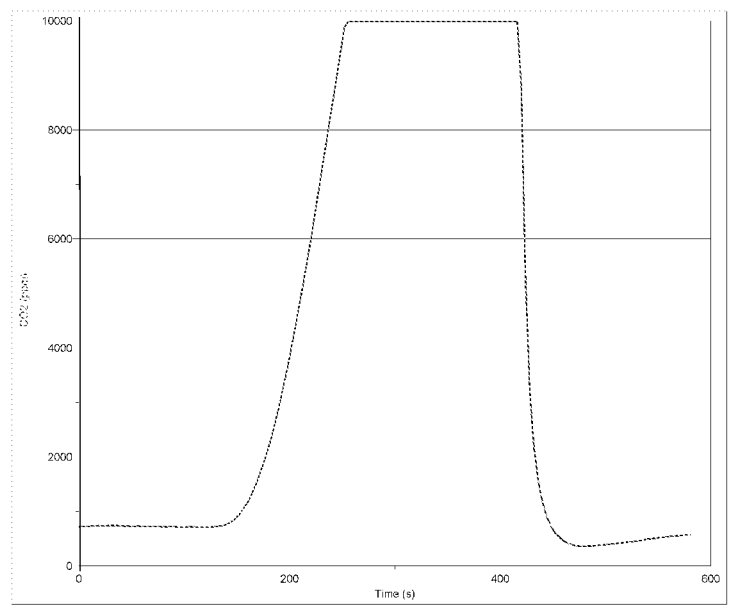

The results are shown in FIG. 8. These results clearly show the polymer materials of the invention have comparable barrier properties with PET and metal.

Example 14

Swelling Properties of Different Polymer Composites:
Various polymers were prepared essentially as described in Example 11 with the ingredients described in Table 15.

TABLE 15

| Order of Addition | RMA-1258- | 99 | 103 | 104 | 107 | 108 |
|---|---|---|---|---|---|---|
| 1 | Ethylmethacrylate | 7 ml | 7 ml | 5 ml | 3.6 ml | 3.6 ml |
| 2 | N,N' Dimethylacrylamide | 4 ml | 4 ml | 3 ml | 2.0 ml | 2.0 ml |
| 3 | Laurylmethacrylate | 5 ml | 5 ml | 4 ml | 1.7 ml | 1.7 ml |
| 4 | Crosslinker; Aldrich 24,684-0 | 7 ml | 7 ml | 5 ml | 3.6 ml | 3.6 ml |
| 5 | Acrylonitrile | 13 ml | 13 ml | 10 ml | 7 ml | 7 ml |
| 5 | AIBN; Aldrich 44,091-4 | 200 mg | 200 mg | 150 mg | 75 mg | 75 mg |
| 6 | Ammonium persulphate | 150 mg | 150 mg | 100 mg | 50 mg | 50 mg |
| 7 | Sisal_methacrylate | — | 1.9 g | 1.5 g | 1.0 g | 1.0 g |
| 8 | Barley straw methacrylate | 7.5 g | 5.6 g | 4.5 g | 3.0 g | 3.0 g |
|   | Yield dry Wt. | 17.61 g | 10.68 g | 7.78 g | 5.33 g | 6.16 |
|   | Water swelled wt. | 19.44 g | 11.59 g | 8.57 g | 5.94 g | 6.75 |
|   | Swelling factor | 9.4% | 7.8% | 9.2% | 10.3% | 8.8% |
|   | % Biomaterial | 69% | 74% | 76% | 65% | 64% |

Swelling factor was calculated based on weight gained by the polymer after swelling in water for 24 h. Biomaterial percentage is calculated based on the final yield of the polymer and weight of natural fibre added during polymer preparation. The results show that the water swelling properties of the polymers were reduced compared to the polymers described in Example 2.

Example 15

Preparation of Methyl a-D-Glucoside Methacrylate.

A mixture of crystalline methyl a-D-glucoside (Sigma M-9376) (5.16 g, 26.57 mmol, 1 equiv.) triethylamine (18.81 mL 135.09 mmol, 5.08 equiv.) and hydroquinone monomethyl ether (200 mg; 1.6 mmol 0.06 equiv.) in dichloromethane (DCM, 75 mL) was stirred at room temperature followed by slow addition of methacryloyl chloride (13.88 g, 132.85 mmol, 5 equiv.) under argon. The reaction mixture was stirred at room temperature for 12 h and filtered. The filtrate was collected and ethanol (10 ml) was added to quench the reaction. The reaction mixture was evaporated to dryness and redissolved in ethyl acetate (200 ml) and organic phase washed with saturated solution of sodium bicarbonate, water, and HCl (0.05N) and finally with brine. The organic phase was concentrated and loaded on to a silica gel flash column and eluted with 10% ethyl acetate-heptane solution. The product was obtained (10 g, 80%) as golden yellow syrup after evaporation of solvent.

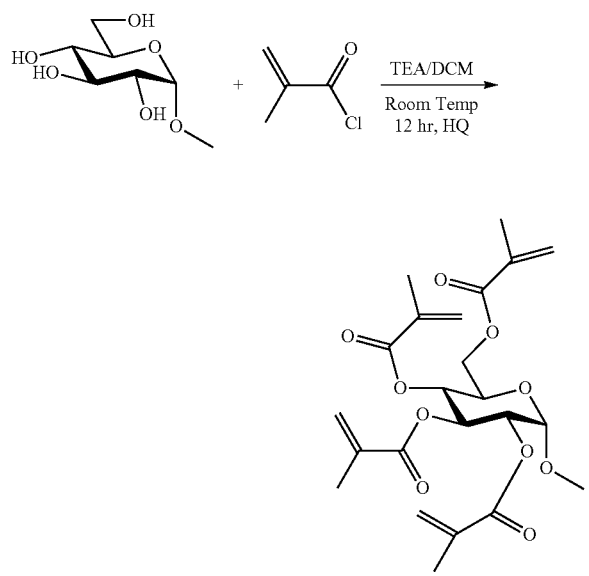

Analytical RP-HPLC acetonitrile-water 0.1% TFA shows two major peaks with same molecular wt.

Mol. wt. 489.1698 obtained (Exact Mass: 489.1737; M+Na $C_{23}H_{30}NaO_{10}$)

Example 16

Biodegradability Study
Soil Burial Test

Test specimens of polymer material RMA-1118-120 were dried in air oven and weighed before burying it outdoor garden in ordinary garden mould (black soil) under bushes in specified areas.

The RMA-1118-120 polymer was prepared essentially as described in Example 1 from the ingredients described in Table 16.

TABLE 16

| RMA-1118-120 Order of Addition | Polymer for Biodegradation studies | Amount |
|---|---|---|
| 1 | Cellulose methacrylate | 800 mg |
| 2 | Barley straw methacrylate | 500 mg |
| 3 | Ethylmetharylate | 2 ml |
| 4 | Acrylic acid | 4 ml |
| 5 | Coconut fibre metharylate | 250 mg |
| 6 | Crosslinker; Aldrich 24,684-0 | 1 ml |
| 7 | Ethylacrylate | 2 ml |

TABLE 16-continued

| RMA-1118-120 Order of Addition | Polymer for Biodegradation studies | Amount |
|---|---|---|
| 8 | TEMED | 1 ml |
| 9 | Lauroyl peroxide; Aldrich 290785 | 375 mg |
| 10 | AIBN; Aldrich 44,091-4 | 375 mg |
| 11 | Ammonium persulphate | 800 mg |
| 12 | EtOH | 5 ml |
| 13 | Water | 4 ml |

Figure 9:
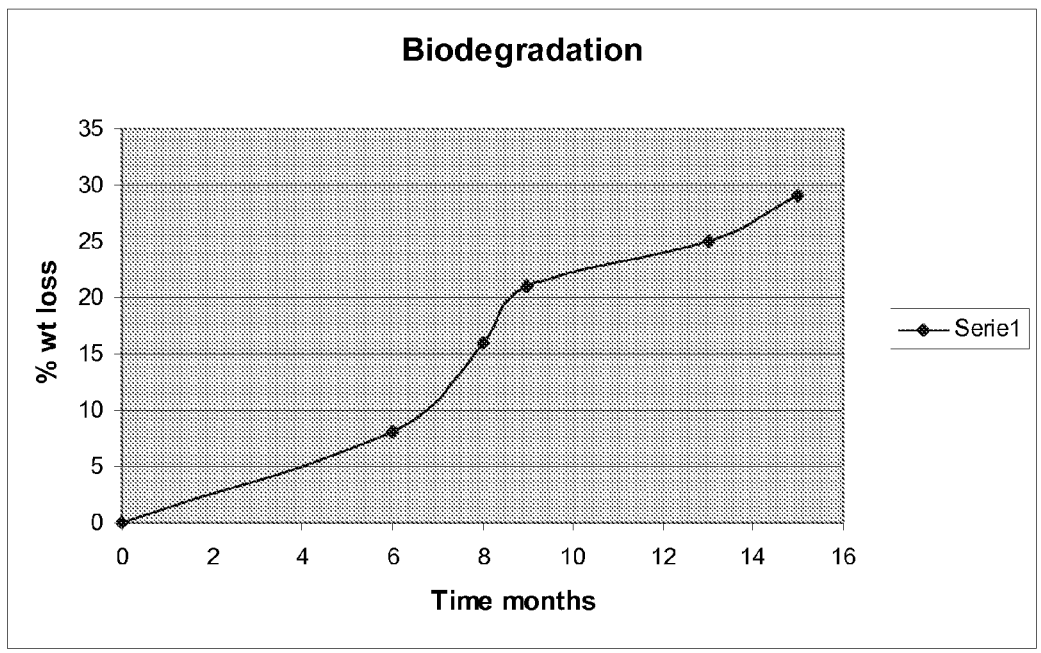
FIG. 9 illustrates weight loss over time after burial in soil of a disc of polymer RMA-1118-120.

PET bottle cap was used as negative control. The samples were taken out and checked in 2-3 months time and thoroughly cleaned using water and photograph taken, the samples were dried at 70° C. two hr and weighted. After weight analysis the samples were put back to soil. There was no weight change observed in the case of PET bottle cap. The weight loss over time of the test specimen is shown in FIG. 9 and Table 15.

TABLE 15

| Date In | Sample No. | Dry Weight | Date out | Final dry wt | Time/ Months | % Degradation |
|---|---|---|---|---|---|---|
| 19-aug-08 | RMA-1118-120 A | 3.437 g | 10-nov-09 | 2.45 g | 15 | 29 |
|  | RMA-1118-120 A | 2.7 g | 12-maj-09 | 2.7 g | 9 | 21 |
| 30-sep-08 | RMA-1118-120 B | 3.502 g | 10-nov-09 | 2.629 g | 13 | 25 |
|  | RMA-1118-120 B | 2.963 g | 04-maj-09 | 2.963 | 8 | 16 |
| 12-maj-09 | RMA-1258-046 | 1.52 g | 10-nov-09 | 1.4 g | 6 | 8 |
| 30-sep-08 | PPCap Control | 1.7 g | 10-nov-09 | 1.7 g | 13 | 0 |

REFERENCES

Chemistry and Technology of Biodegradable Polymers Ed G:J:L. Griffin Blackie Academic & Professional, 1994, 1995.

Test methods and standards for biodegradable plastics: By K. J. Seal, Page: 132.

The invention claimed is:

1. A polymer material which is a copolymer polymerised at least from:
   a) at least one filler material, wherein the filler material is provided in the form of small particles, wherein the average longest cross section of the particles is in the range of 0.1 to 750 μm, and wherein said filler material is provided in the form of a powder, said filler material comprising finely ground barley straw covalently —O— linked to

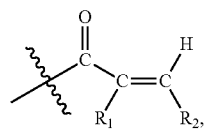

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen, wherein said filler comprises a polymer covalently linked to —OH or a long chain alcohol comprising at least 10 carbon atoms; and b) at least one monomer and/or at least one cross-linker, wherein i) the monomer is a monomer of the general structure

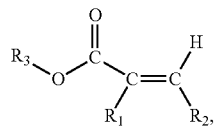

or the general structure

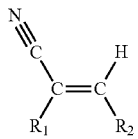

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen and $R_3$ is selected from the group consisting of linear and branched alkyl, alkenyl, alkoxy, ethers, aliphatic ring optionally comprising heteroatoms, alcohols, halogen, alkyl substituted with halogen and —H and wherein ii) the cross-linker is a sugar moiety covalently O-linked to at least two

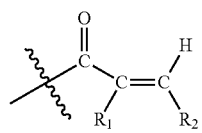

groups, wherein $R_1$ and $R_2$ independently are selected from the group consisting of —H and $C_{1-6}$ alkyl, and wherein said two groups may be identical or different; and c) optionally, at least one plant fiber material, which is covalently —O-linked to

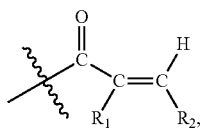

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, $C_{1-6}$ alkenyl, halogen and $C_{1-6}$ alkyl substituted with halogen.

2. The polymer material according to claim 1, wherein the polymer material is a copolymer polymerised at least from:

a) the at least one filler material; and b) the at least one cross-linker.

3. The polymer material according to claim 1, wherein the polymer material is a copolymer polymerised at least from:

a) the at least one filler material;

b) the at least one monomer; and c) the at least one —O-linked plant fiber material.

4. A container for storage of liquids comprising the polymer material according to claim 1.

5. A food storage material comprising the polymer according to claim 1.

6. A method for preparing the polymer material according to claim 1, said method comprising the steps of a) providing at least one filler material, wherein the filler material is provided in the form of small particles, wherein the average longest cross section of the particles is in the range of 0.1 to 750 μm, and wherein the filler material is provided in the form of a powder, said filler material comprising finely ground barley straw covalently —O-linked to

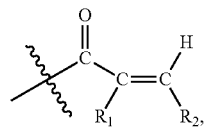

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen; and b) providing at least one monomer and/or at least one cross-linker, wherein i. the monomer is a monomer of the general structure

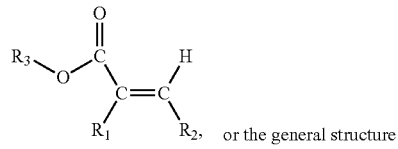

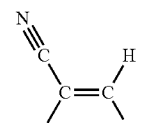

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen and $R_3$ is selected from the group consisting of linear and branched alkyl, alkenyl, alkoxy, ethers, aliphatic ring optionally comprising heteroatoms, alcohols, halogen, alkyl substituted with halogen and —H; and wherein ii. the cross-linker is a sugar moiety covalently O-linked to at least two

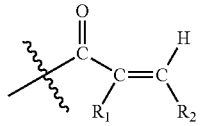

groups,
wherein $R_1$ and $R_2$ independently are selected from the group consisting of —H and $C_{1-6}$ alkyl,
and wherein said two groups may be identical or different;

c) optionally providing at least one plant fiber material, which is covalently —O-linked to

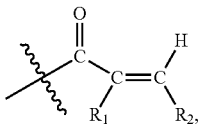

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen; and d) mixing said plant fiber material, said filler material, said monomer and optionally additional components, e) adding one or more free radical initiators, thereby obtaining a mixture f) optionally transferring the mixture to a mold;

g) incubating the mixture at a temperature in the range of 30 to 200° C. and/or subjecting the mixture to UV irradiation, wherein steps a), b) and c) may be performed simultaneously or sequentially in any order and step c) optionally may be performed after step e).

7. A polymer material which is a copolymer polymerised at least from:

a) at least one filler material with an average particle size of at the most 750 μm, wherein the filler material is provided in the form of a powder, said filler material comprising finely ground plant material covalently —O-linked to

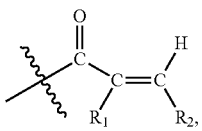

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen, wherein said filler comprises a polymer covalently linked to —OH or a long chain alcohol comprising at least 10 carbon atoms; and b) at least one monomer and at least one cross-linker, wherein
i) the monomer is a monomer of the general structure

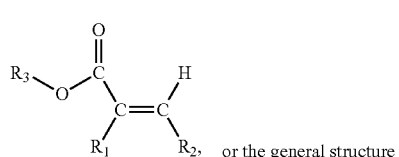

or the general structure

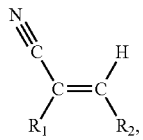

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen and $R_3$ is selected from the group consisting of linear and branched alkyl, alkenyl, alkoxy, ethers, aliphatic ring optionally comprising heteroatoms, alcohols, halogen, alkyl substituted with halogen and —H and ii) the cross-linker is a mono-saccharide or a disaccharide covalently O-linked to at least two

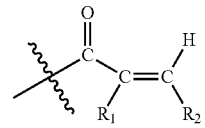

groups,
wherein $R_1$ and $R_2$ independently are selected from the group consisting of —H and $C_{1-6}$ alkyl,
and wherein said at least two groups may be identical or different; and c) optionally at least one plant fiber material, which is covalently —O-linked to

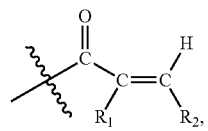

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen.

8. The polymer material according to claim 7, wherein the plant fiber material has an average particle size of in the range of 100 μm to 25 mm.

9. The polymer material according to claim 7, wherein the plant fiber material comprises plant fibers from one or more plants selected from the group consisting of Abaca, Bagasse, Bamboo, Banana, Barley, Broom root, Cantala, Caroa, China jute, Coir, Cotton, Curaua, Date palm, Flax, Hemp, Henequen, Isora, Istle, Jute, Kapok, Kenaf, Kudzu, Mauritius hemp, Nettle, Oil palm, Piassava, Pineapple, Phormium, Roselle, Ramie, Sansevieria, Sisal, Sponge gourd, Cereals, Sun hemp, Cadillo/urena and Wood.

10. The polymer material according to claim 7, wherein at least 1%, of the particles of the filler have a longest cross section of at the most 10 μm.

11. The polymer material according to claim 7, wherein the at least one filler comprises finely ground plant material from a plant selected from the group consisting of Abaca, Bagasse, Bamboo, Banana, Broom root, Cantala, Caroa, China jute, Coir, Cotton, Curaua, Date palm, Flax, Hemp, Henequen, Isora, Istle, Jute, Kapok, Kenaf, Kudzu, Mauritius hemp, Nettle, Oil palm, Piassava, Pineapple, Phormium, Roselle, Ramie, Sansevieria, Sisal, Sponge gourd, Cereals, Sun hemp, Cadillo/urena and Wood.

12. The polymer material according to claim 7, wherein the at least one filler filler comprises or consists of finely ground barley straw.

13. The polymer material according to claim 7, wherein the polymer material comprises at least 50%, plant fiber material and filler material, and wherein said filler consists of finely ground plant material.

14. The polymer material according to claim 7, wherein the polymer material comprises at least 50% polymerized plant fiber material and filler material.

15. The polymer material according to claim 7, wherein said polymer material is biodegradable.

16. The polymer material according to claim 7, wherein the polymer material is essentially impermeable to $CO_2$.

17. A container for storage of liquids comprising the polymer material according to claim 7.

18. The container according to claim 17, wherein said container is prepared from said polymer material.

19. A food storage material comprising the polymer according to claim 7.

20. The food storage material according to claim 19, wherein the food storage material is selected from the group consisting of crates, cans, boxes, glass substitutes and table utensils.

21. A method for preparing the polymer material according to claim 7, said method comprising the steps of
a) providing at least one filler material, wherein the filler material is provided in the form of small particles, wherein the average longest cross section of the particles is in the range of 0.1 to 750 μm, and wherein the filler material is provided in the form of a powder, said filler material comprising finely ground plant material covalently —O-linked to

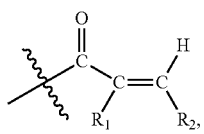

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen; and b) providing at least one monomer, wherein
i) the monomer is a monomer of the general structure

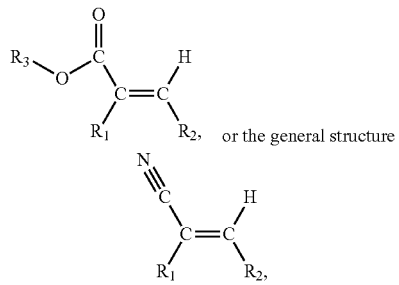

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen and $R_3$ is selected from the group consisting of linear and branched alkyl, alkenyl, alkoxy, ethers, aliphatic ring optionally comprising heteroatoms, alcohols, halogen, alkyl substituted with halogen and —H; and
ii) providing at least one cross-linker, wherein the cross-linker is a sugar moiety covalently O-linked to at least two

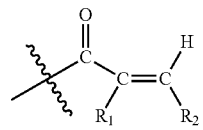

groups,
wherein $R_1$ and $R_2$ independently are selected from the group consisting of —H and $C_{1-6}$ alkyl
and wherein said two groups may be identical or different;
c) optionally providing at least one plant fiber material, which is covalently —O-linked to

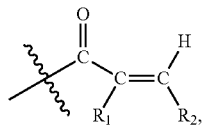

wherein $R_1$ and $R_2$ independently are selected from the group consisting of —H, $C_{1-6}$ alkyl, $C_{1-6}$ alcohols, $C_{1-6}$ alkoxy, $C_{1-6}$ ethers, halogen and $C_{1-6}$ alkyl substituted with halogen; and
d) mixing said plant fiber material, said filler material, said monomer and optionally additional components;
e) adding one or more free radical initiators, thereby obtaining a mixture;
f) optionally transferring the mixture to a mold;
g) incubating the mixture at a temperature in the range of 30 to 200° C. and/or subjecting the mixture to UV irradiation;
wherein steps a), b) and c) may be performed simultaneously or sequentially in any order and step c) optionally may be performed after step e).

22. The method according to claim 21, wherein:
mixing in d) comprises mixing said plant fiber material, said filler material, said monomer, said cross linker and optionally additional components; and
incubating in g) at a temperature of 30 to 100° C. and/or subjecting the mixture to UV irradiation.

* * * * *